(12) United States Patent
Tsuru

(10) Patent No.: US 9,870,343 B2
(45) Date of Patent: Jan. 16, 2018

(54) PRODUCT INSPECTION DEVICE, PRODUCT INSPECTION METHOD, AND COMPUTER PROGRAM

(71) Applicant: Murata Manufacturing Co., Ltd., Nagaokakyo-shi, Kyoto-fu (JP)

(72) Inventor: Teruhisa Tsuru, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 470 days.

(21) Appl. No.: 14/685,722

(22) Filed: Apr. 14, 2015

(65) Prior Publication Data
US 2015/0220489 A1 Aug. 6, 2015

Related U.S. Application Data

(63) Continuation of application No. 13/303,346, filed on Nov. 23, 2011, now Pat. No. 9,037,436, which is a (Continued)

(30) Foreign Application Priority Data

May 29, 2009 (JP) ................................. 2009-130455

(51) Int. Cl.
*G06F 17/18* (2006.01)
*G06Q 10/00* (2012.01)
(Continued)

(52) U.S. Cl.
CPC ............ *G06F 17/18* (2013.01); *G01M 99/00* (2013.01); *G06Q 10/00* (2013.01); *G06Q 10/0635* (2013.01)

(58) Field of Classification Search
CPC ... G06Q 10/00; G06Q 10/0635; G01M 99/00; G06F 17/18
(Continued)

(56) References Cited

U.S. PATENT DOCUMENTS 5,512,842 A * 4/1996 Kida ...................... G01R 31/01
324/537
6,430,522 B1 8/2002 O'Brien, Jr. et al.
(Continued)

FOREIGN PATENT DOCUMENTS

CN 101421679 A 4/2009
JP S63-305974 A 12/1988
(Continued)

OTHER PUBLICATIONS

Dobgert, M. "Understanding Measurement Risk", 2007 NCSL International Workshop and Symposium.
(Continued)

*Primary Examiner* — Stephanie Bloss
(74) *Attorney, Agent, or Firm* — Arent Fox LLP

(57) ABSTRACT

A product inspection device that includes a measuring section, a deemed standard deviation calculation unit, a measurement value standard deviation calculation unit, a determination unit, and a risk calculation unit. The measuring section measures characteristic values of products, the deemed standard deviation calculation unit calculates a deemed standard deviation, and the risk calculation unit calculates a consumer risk and a producer risk based on at least one of an average value of the measured characteristic values of some of the products contained in a measured product lot, the deemed standard deviation, or the measurement value standard deviation. The determination unit changes a inspection standard based on at least one of the calculated consumer risk or the calculated producer risk, and determines whether or not all the products contained in the product lot are non-defective articles with the changed inspection standard as a reference.

9 Claims, 12 Drawing Sheets

Related U.S. Application Data continuation of application No. PCT/JP2010/058325, filed on May 18, 2010.

(51) Int. Cl.
  *G06Q 10/06* (2012.01)
  *G01M 99/00* (2011.01)

(58) Field of Classification Search
  USPC .......................................................... 702/181
  See application file for complete search history.

(56) References Cited

U.S. PATENT DOCUMENTS

| | | | |
|---|---|---|---|
| 7,072,796 B2 | 7/2006 | Kataoka | |
| 2003/0229464 A1 | 12/2003 | Takanabe | |
| 2004/0093115 A1* | 5/2004 | Usui | B29C 45/768 700/204 |
| 2006/0210141 A1* | 9/2006 | Kojitani | G06K 9/6269 382/141 |
| 2006/0235560 A1* | 10/2006 | Ogawa | G05B 19/41875 700/109 |
| 2006/0265185 A1 | 11/2006 | Lanzerotti et al. | |
| 2007/0105238 A1 | 5/2007 | Mandl et al. | |
| 2009/0177439 A1 | 7/2009 | Samples et al. | |
| 2010/0010941 A1 | 1/2010 | Keck | |
| 2010/0100221 A1 | 4/2010 | Yadav et al. | |
| 2012/0072174 A1 | 3/2012 | Tsuru | |
| 2012/0095803 A1 | 4/2012 | Tsuru | |

FOREIGN PATENT DOCUMENTS

| | | |
|---|---|---|
| JP | 3-052247 A | 3/1991 |
| JP | 8-274139 A | 10/1996 |
| JP | 2005-107896 A | 4/2005 |
| JP | 2007-040864 A | 2/2007 |
| JP | 2007-139621 A | 6/2007 |
| JP | 2008-216042 A | 9/2008 |

OTHER PUBLICATIONS

Deaver, D. "Managing Calibration Confidence in the Real World" 1995 NCSL Workshop & Symposium.
PCT/JP2010/058325 Written Opinion dated Jun. 28, 2010.

* cited by examiner

PRODUCT INSPECTION DEVICE, PRODUCT INSPECTION METHOD, AND COMPUTER PROGRAM

CROSS REFERENCE TO RELATED APPLICATIONS

The present application is a continuation of U.S. patent application Ser. No. 13/303,346, filed Nov. 23, 2011, which is a continuation of International application No. PCT/JP2010/058325, filed May 18, 2010, which claims priority to Japanese Patent Application No. 2009-130455, filed May 29, 2009, the entire contents of each of which are incorporated herein by reference.

FIELD OF THE INVENTION

The present invention relates to a product inspection device, a product inspection method, and a computer program for inspecting products.

BACKGROUND OF THE INVENTION

A product has a characteristic value, which indicates a predetermined characteristic, measured before shipment, and is discriminated to a non-defective article or a defective article depending on whether or not a predetermined standard is satisfied. The product is discriminated by comparing the measured characteristic value of the product and a inspection standard, of which condition is stricter than a product standard (a characteristic value required for the product), using a product inspection device. If the variation in the measured characteristic values of the products is only the variation in the characteristic values of the products themselves, whether each of the products is a non-defective article or a defective article can be correctly discriminated by the product inspection device even if the inspection standard is defined under the same condition as that of the product standard.

However, the variation in the measured characteristic values of the products includes not only the variation in the characteristic values of the products themselves, but also the variation in the measurement values of the measurement system. Thus, the products determined as non-defective articles by the product inspection device may include a product out of the product standard, or the products determined as defective articles may include a product within the product standard. In particular, considering the influence on users of the products, the possibility that the product determined as a non-defective article by the product inspection device is a product out of the product standard needs to be lowered, where the inspection standard, of which condition is stricter than that of the product standard, is usually defined to discriminate the products.

In the product inspection device, the probability that a product out of the product standard is mistakenly determined as a non-defective article based on the inspection standard is called a consumer risk, and the probability that a product within the product standard is mistakenly determined as a defective article based on the inspection standard is called a producer risk. It is generally known that the consumer risk can be reduced by defining the inspection standard having a stricter condition than that of the product standard, but the producer risk becomes rather greater and the percentage (non-defective article rate) of being discriminated as non-defective articles by the product inspection device lowers.

A method of calculating the consumer risk and the producer risk is disclosed in Non-Patent Documents 1 and 2. Non-Patent Document 1 discloses a method of calculating the consumer risk and the producer risk in a product inspection device using the Monte Carlo method. Non-Patent Document 2 discloses a method of calculating the consumer risk and the producer risk assuming that the distributions of the variation in the characteristic values of the products and the variation in the measurement values are normal distributions using a double integral equation.

Non-Patent Document 1: M. Dobbert "Understanding Measurement Risk", NCSL International Workshop and Symposium, August 2007.

Non-Patent Document 2: David Deaver, "Managing Calibration Confidence in the Real World", NCSL International Workshop and Symposium, 1995.

SUMMARY OF THE INVENTION

An average value and a standard deviation of measured characteristic values of products being manufactured daily fluctuate for every product lot in which a predetermined number of the products are included as one unit. Thus, in a product inspection device, a consumer risk and a producer risk fluctuate for every product lot manufactured daily even if variation in the product standard, the inspection standard, and the measurement values of a measurement system do not fluctuate.

Although the fluctuation of the variation in the measurement values of the measurement system is small compared to the fluctuation of the average value and the standard deviation of the characteristic values of the products for every product lot, the consumer risk and the producer risk fluctuate also by the fluctuation of the variation in the measurement values of the measurement system.

The product inspection device has a high possibility of determining a product out of the product standard as a non-defective article when the consumer risk fluctuates and becomes large. Therefore, the possibility that the product out of the product standard is mistakenly shipped to a user increases. The product inspection device also has a high possibility of determining a product within the product standard as a defective article when the producer risk fluctuates and becomes large. Therefore, the percentage (non-defective article rate) of being determined as non-defective articles lowers.

In light of the foregoing, it is an object of the present invention to provide a product inspection device, a product inspection method, and a computer program capable of inspecting products based on a consumer risk and a producer risk.

To achieve the above object, a product inspection device according to a first invention includes: a measuring section for measuring characteristic values indicating predetermined characteristics of products; a deemed standard deviation calculation unit for calculating a standard deviation of variation in the measured characteristic values as a deemed standard deviation; a measurement value standard deviation calculation unit for calculating a standard deviation of measurement value variation indicating variation in measurement results of the measuring section itself as a measurement value standard deviation; a determination unit for determining whether or not each of the products is a non-defective article depending on whether or not the measured characteristic value is in a range smaller than or equal to an upper limit value and greater than or equal to a lower limit value with an inspection standard defining the upper limit value and the lower limit value of the characteristic values for determining defectiveness of the products as a reference; and a risk calculation unit for calculating a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation; wherein the measuring section measures the characteristic values of some of the products contained in a product lot having a predetermined number of the products as one unit; the deemed standard deviation calculation unit calculates the deemed standard deviation from the measured characteristic values of some of the products; the risk calculation unit calculates the consumer risk and the producer risk based on the average value of the measured characteristic values of some of the products, the deemed standard deviation, and the measurement value standard deviation; and the determination unit changes the inspection standard based on at least one of the calculated consumer risk or the calculated producer risk, and determines whether or not all the products contained in the product lot are non-defective articles with the changed inspection standard as a reference.

To achieve the above object, a product inspection device according to a second invention includes: a measuring section for measuring characteristic values indicating predetermined characteristics of products; a deemed standard deviation calculation unit for calculating a standard deviation of variation in the measured characteristic values as a deemed standard deviation; a measurement value standard deviation calculation unit for calculating a standard deviation of measurement value variation indicating variation in measurement results of the measuring section itself as a measurement value standard deviation; a determination unit for determining whether or not each of the products is a non-defective article depending on whether or not the measured characteristic value is in a range smaller than or equal to an upper limit value and greater than or equal to a lower limit value with an inspection standard defining the upper limit value and the lower limit value of the characteristic values for determining defectiveness of the products as a reference; a risk calculation unit for calculating a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation; and a product lot determination unit for determining whether or not a product lot is a non-defective lot based on at least one of the calculated consumer risk or the calculated producer risk.

According to the product inspection device of a third invention, in the second invention, when the product lot is determined as a defective lot in the product lot determination unit, the determination unit re-measures the characteristic value of the product of which the measured characteristic value belongs to a range smaller than or equal to the upper limit value and greater than or equal to the lower limit value of the characteristic value defined in the inspection standard, the product of which the measured characteristic value belongs to a range from the upper limit value to a predetermined value smaller than the upper limit value and the product of which the measured characteristic value belongs to a range from the lower limit value to a predetermined value greater than the lower limit value, or the product of which the measured characteristic value belongs to any one of the ranges, and re-determines whether or not the product is a non-defective article with the inspection standard as a reference based on the re-measured characteristic value.

According to the product inspection device according to a fourth invention, in the second invention, when the product lot is determined as a non-defective lot in the product lot determination unit, the determination unit re-measures the characteristic value of the product of which the measured characteristic value belongs to a range greater than the upper limit value of the characteristic value defined in the inspection standard and the product of which the measured characteristic value belongs to a range smaller than the lower limit value, the product of which the measured characteristic value belongs to any one of the ranges, the product of which the measured characteristic value belongs to a range from the upper limit value to a predetermined value greater than the upper limit value and the product of which the measured characteristic value belongs to a range from the lower limit value to a predetermined value smaller than the lower limit value, or the product of which the measured characteristic value belongs to any one of the ranges, and re-determines whether or not the product is a non-defective article with the inspection standard as a reference based on the re-measured characteristic value.

According to the product inspection device of a fifth invention, in the third or fourth invention, the predetermined value smaller or greater than the upper limit value is smaller or greater than the upper limit value by three times the measurement value standard deviation, and the predetermined value greater or smaller than the lower limit value is greater or smaller than the lower limit value by three times the measurement value standard deviation.

According to the product inspection device of a sixth invention, in any one of the first to fifth inventions, the risk calculation unit includes: a product standard deviation calculating portion for calculating the standard deviation of the characteristic value variation of the products as a product standard deviation based on the deemed standard deviation and the measurement value standard deviation; and a risk calculating portion for dividing a probability distribution of the calculated product standard deviation into a plurality of zones, and calculating a probability that the product belonging to a zone out of the product standard is mistakenly determined as a product belonging to a zone within the product standard as the consumer risk and calculating a probability that the product belonging to a zone within the product standard is mistakenly determined as a product belonging to a zone out of the product standard as the producer risk, assuming that the probability distribution in each of the zones follows the probability distribution of the measurement value standard deviation.

According to the product inspection device of a seventh invention, in any one of the first to sixth inventions, the measurement value standard deviation calculation unit includes: a classifying portion for classifying the products to non-defective articles and defective articles according to the inspection standard based on the measured characteristic values; a re-classifying portion for re-measuring the characteristic values of the products classified as non-defective articles or defective articles, and re-classifying the products to non-defective articles and defective articles according to the inspection standard based on the re-measured characteristic values; an estimated number calculating portion for calculating the number of the products re-classified as non-defective articles or the number of the products re-classified as defective articles when re-classified at least once as an estimated number of the products re-classified as non-defective articles or defective articles, based on the probability distribution of the deemed standard deviation having the standard deviation of the characteristic value variation of the products and the measurement value standard deviation as variables; and a standard deviation calculating portion for changing the variables of the probability distribution of the deemed standard deviation such that the number of the products re-classified as non-defective articles or the number of the products re-classified as defective articles when re-classified at least once and the estimated number of the products re-classified as non-defective articles or defective articles substantially match each other, and calculating the changed variables as the standard deviation of the characteristic value variation of the products and the measurement value standard deviation.

To achieve the above object, a product inspection method according to an eighth invention includes the steps of: measuring characteristic values indicating predetermined characteristics of products with a measuring section; calculating a standard deviation of variation in the measured characteristic values as a deemed standard deviation; calculating a standard deviation of measurement value variation indicating variation in measurement results of the measuring section itself as a measurement value standard deviation; determining whether or not each of the products is a non-defective article depending on whether or not the measured characteristic value is in a range smaller than or equal to an upper limit value and greater than or equal to a lower limit value with an inspection standard defining the upper limit value and the lower limit value of the characteristic values for determining defectiveness of the products as a reference; and calculating a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation; wherein the characteristic values of some of the products contained in a product lot having a predetermined number of the products as one unit are measured, the deemed standard deviation is calculated from the measured characteristic values of some of the products, the consumer risk and the producer risk are calculated based on the average value of the measured characteristic values of some of the products, the deemed standard deviation, and the measurement value standard deviation, and the inspection standard is changed based on at least one of the calculated consumer risk or the calculated producer risk, and whether or not all the products contained in the product lot are non-defective articles is determined with the changed inspection standard as a reference.

To achieve the above object, a product inspection method according to a ninth invention includes the steps of: measuring characteristic values indicating predetermined characteristics of products with a measuring section; calculating a standard deviation of variation in the measured characteristic values as a deemed standard deviation; calculating a standard deviation of measurement value variation indicating variation in measurement results of the measuring section itself as a measurement value standard deviation; determining whether or not each of the products is a non-defective article depending on whether or not the measured characteristic value is in a range smaller than or equal to an upper limit value and greater than or equal to a lower limit value with an inspection standard defining the upper limit value and the lower limit value of the characteristic values for determining defectiveness of the products as a reference; calculating a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation; and determining whether or not a product lot is a non-defective lot based on at least one of the calculated consumer risk or the calculated producer risk.

According to the product inspection method of a tenth invention, in the ninth invention, when the product lot is determined as a defective lot, the characteristic value of the product of which the measured characteristic value belongs to a range smaller than or equal to the upper limit value and greater than or equal to the lower limit value of the characteristic value defined in the inspection standard, the product of which the measured characteristic value belongs to a range from the upper limit value to a predetermined value smaller than the upper limit value and the product of which the measured characteristic value belongs to a range from the lower limit value to a predetermined value greater than the lower limit value, or the product of which the measured characteristic value belongs to any one of the ranges is re-measured, and whether or not the product is a non-defective article is re-determined with the inspection standard as a reference based on the re-measured characteristic value.

According to the product inspection method of an eleventh invention, in the ninth invention, when the product lot is determined as a non-defective lot, the characteristic value of the product of which the measured characteristic value belongs to a range greater than the upper limit value of the characteristic value defined in the inspection standard and the product of which the measured characteristic value belongs to a range smaller than the lower limit value, the product of which the measured characteristic value belongs to any one of the ranges, the product of which the measured characteristic value belongs to a range from the upper limit value to a predetermined value greater than the upper limit value and the product of which the measured characteristic value belongs to a range from the lower limit value to a predetermined value smaller than the lower limit value, or the product of which the measured characteristic value belongs to any one of the ranges is re-measured, and whether or not the product is a non-defective article is re-determined with the inspection standard as a reference based on the re-measured characteristic value.

According to the product inspection method of a twelfth invention, in the tenth or eleventh invention, the predetermined value smaller or greater than the upper limit value is smaller or greater than the upper limit value by three times the measurement value standard deviation, and the predetermined value greater or smaller than the lower limit value is greater or smaller than the lower limit value by three times the measurement value standard deviation.

According to the product inspection method of a thirteenth invention, in any one of the eighth to twelfth inventions, the standard deviation of the characteristic value variation of the products is calculated as a product standard deviation based on the deemed standard deviation and the measurement value standard deviation, and a probability distribution of the calculated product standard deviation is divided into a plurality of zones, a probability that the product belonging to a zone out of the product standard is mistakenly determined as a product belonging to a zone within the product standard is calculated as the consumer risk and a probability that the product belonging to a zone within the product standard is mistakenly determined as a product belonging to a zone out of the product standard is calculated as the producer risk, assuming that the probability distribution in each of the zones follows the probability distribution of the measurement value standard deviation.

According to the product inspection method of a fourteenth invention, in any one of the eighth to thirteenth inventions, the products are classified to non-defective articles and defective articles according to the inspection standard based on the measured characteristic values, the characteristic values of the products classified as non-defective articles or defective articles are re-measured, and the products are re-classified to non-defective articles and defective articles according to the inspection standard based on the re-measured characteristic values, the number of the products re-classified as non-defective articles or the number of the products re-classified as defective articles when re-classified at least once is calculated as an estimated number of the products re-classified as non-defective articles or defective articles, based on the probability distribution of the deemed standard deviation having the standard deviation of the characteristic value variation of the products and the measurement value standard deviation as variables, and the variables of the probability distribution of the deemed standard deviation are changed such that the number of the products re-classified as non-defective articles or the number of the products re-classified as defective articles when re-classified at least once and the estimated number of the products re-classified as non-defective articles or defective articles substantially match each other, and the changed variables are calculated as the standard deviation of the characteristic value variation of the products and the measurement value standard deviation.

To achieve the above object, a computer program according to a fifteenth invention relates to a computer program executable in a product inspection device for inspecting products, the computer program causing the product inspection device to function as: a measuring means for measuring characteristic values indicating predetermined characteristics of products; a deemed standard deviation calculation means for calculating a standard deviation of variation in the measured characteristic values as a deemed standard deviation; a measurement value standard deviation calculation means for calculating a standard deviation of measurement value variation indicating variation in measurement results of the measuring means itself as a measurement value standard deviation; a determination means for determining whether or not each of the products is a non-defective article depending on whether or not the measured characteristic value is in a range smaller than or equal to an upper limit value and greater than or equal to a lower limit value with an inspection standard defining the upper limit value and the lower limit value of the characteristic values for determining defectiveness of the products as a reference; and a risk calculation means for calculating a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation; wherein the measuring means is caused to function as a means for measuring the characteristic values of some of the products contained in a product lot having a predetermined number of the products as one unit, the deemed standard deviation calculation means is caused to function as a means for calculating the deemed standard deviation from the measured characteristic values of some of the products, the risk calculation means is caused to function as a means for calculating the consumer risk and the producer risk based on the average value of the measured characteristic values of some of the products, the deemed standard deviation, and the measurement value standard deviation, and the determination means is caused to function as a means for changing the inspection standard based on at least one of the calculated consumer risk or the calculated producer risk, and determining whether or not all the products contained in the product lot are non-defective articles with the changed inspection standard as a reference.

To achieve the above object, a computer program according to a sixteenth invention relates to a computer program executable in a product inspection device for inspecting products, the computer program causing the product inspection device to function as: a measuring means for measuring characteristic values indicating predetermined characteristics of products; a deemed standard deviation calculation means for calculating a standard deviation of variation in the measured characteristic values as a deemed standard deviation; a measurement value standard deviation calculation means for calculating a standard deviation of measurement value variation indicating variation in measurement results of the measuring means itself as a measurement value standard deviation; a determination means for determining whether or not each of the products is a non-defective article depending on whether or not the measured characteristic value is in a range smaller than or equal to an upper limit value and greater than or equal to a lower limit value with an inspection standard defining the upper limit value and the lower limit value of the characteristic values for determining defectiveness of the products as a reference; a risk calculation means for calculating a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation; and a product lot determination means for determining whether or not a product lot is a non-defective lot based on at least one of the calculated consumer risk or the calculated producer risk.

According to the computer program of a seventeenth invention, in the sixteenth invention, when the product lot is determined as a defective lot in the product lot determination means, the determination means is caused to function as a means for re-measuring the characteristic value of the product of which the measured characteristic value belongs to a range smaller than or equal to the upper limit value and greater than or equal to the lower limit value of the characteristic value defined in the inspection standard, the product of which the measured characteristic value belongs to a range from the upper limit value to a predetermined value smaller than the upper limit value and the product of which the measured characteristic value belongs to a range from the lower limit value to a predetermined value greater than the lower limit value, or the product of which the measured characteristic value belongs to any one of the ranges, and re-determining whether or not the product is a non-defective article with the inspection standard as a reference based on the re-measured characteristic value.

According to the computer program of a eighteenth invention, in the sixteenth invention, when the product lot is determined as a non-defective lot in the product lot determination means, the determination means is caused to function as a means for re-measuring the characteristic value of the product of which the measured characteristic value belongs to a range greater than the upper limit value of the characteristic value defined in the inspection standard and the product of which the measured characteristic value belongs to a range smaller than the lower limit value, the product of which the measured characteristic value belongs to any one of the ranges, the product of which the measured characteristic value belongs to a range from the upper limit value to a predetermined value greater than the upper limit value and the product of which the measured characteristic value belongs to a range from the lower limit value to a predetermined value smaller than the lower limit value, or the product of which the measured characteristic value belongs to any one of the ranges, and re-determining whether or not the product is a non-defective article with the inspection standard as a reference based on the re-measured characteristic value.

According to the computer program of a nineteenth invention, in the seventeenth or eighteenth invention, the predetermined value smaller or greater than the upper limit value is smaller or greater than the upper limit value by three times the measurement value standard deviation, and the predetermined value greater or smaller than the lower limit value is greater or smaller than the lower limit value by three times the measurement value standard deviation.

According to the computer program of a twentieth invention, in any one of fifteenth to nineteenth inventions, the risk calculation means is caused to function as: a product standard deviation calculating means for calculating the standard deviation of the characteristic value variation of the products as a product standard deviation based on the deemed standard deviation and the measurement value standard deviation; and a risk calculating means for dividing a probability distribution of the calculated product standard deviation into a plurality of zones, and calculating a probability that the product belonging to a zone out of the product standard is mistakenly determined as a product belonging to a zone within the product standard as the consumer risk and calculating a probability that the product belonging to a zone within the product standard is mistakenly determined as a product belonging to a zone out of the product standard as the producer risk, assuming that the probability distribution in each of the zones follows the probability distribution of the measurement value standard deviation.

According to the computer program of a twenty-first invention, in any one of the fifteenth to twentieth inventions, the measurement value standard deviation calculation means is caused to function as: a classifying means for classifying the products to non-defective articles and defective articles according to the inspection standard based on the measured characteristic values; a re-classifying means for re-measuring the characteristic values of the products classified as non-defective articles or defective articles, and re-classifying the products to non-defective articles and defective articles according to the inspection standard based on the re-measured characteristic values; an estimated number calculating means for calculating the number of the products re-classified as non-defective articles or the number of the products re-classified as defective articles when re-classified at least once as an estimated number of the products re-classified as non-defective articles or defective articles, based on the probability distribution of the deemed standard deviation having the standard deviation of the characteristic value variation of the products and the measurement value standard deviation as variables; and a standard deviation calculating means for changing the variables of the probability distribution of the deemed standard deviation such that the number of the products re-classified as non-defective articles or the number of the products re-classified as defective articles when re-classified at least once and the estimated number of the products re-classified as non-defective articles or defective articles substantially match each other, and calculating the changed variables as the standard deviation of the characteristic value variation of the products and the measurement value standard deviation.

In the first invention, the eighth invention, and the fifteenth invention, the inspection standard is changed based on at least one of the calculated consumer risk or the calculated producer risk, and whether or not all the products contained in the product lot are non-defective articles is determined with the changed inspection standard as a reference. Therefore, the product lot can be managed such that at least one of the consumer risk or the producer risk is always smaller than or equal to a predetermined value.

In the second invention, the ninth invention, and the sixteenth invention, whether or not the product lot is a non-defective lot is determined based on at least one of the calculated consumer risk or the calculated producer risk. Therefore, it is possible to prevent the shipment of the product lot of which at least one of the consumer risk or the producer risk becomes smaller than or equal to a predetermined value.

In the third invention, the tenth invention, and the seventeenth invention, when the product lot is determined as a defective lot, the characteristic value of the product of which the measured characteristic value belongs to the range smaller than or equal to the upper limit value and greater than or equal to the lower limit value of the characteristic value defined in the inspection standard, the product of which the measured characteristic value belongs to the range from the upper limit value to a predetermined value smaller than the upper limit value and the product of which the measured characteristic value belongs to the range from the lower limit value to a predetermined value greater than the lower limit value, or the product of which the measured characteristic value belongs to any one of the ranges is re-measured, and whether or not the product is a non-defective article is re-determined with the inspection standard as a reference based on the re-measured characteristic value. Therefore, the consumer risk or the producer risk can be improved, and the percentage (non-defective article rate) that the product is determined as a non-defective article enhances.

In the fourth invention, the eleventh invention, and the eighteenth invention, when the product lot is determined as a non-defective lot, the characteristic value of the product of which the measured characteristic value belongs to the range greater than the upper limit value of the characteristic value defined in the inspection standard and the product of which the measured characteristic value belongs to the range smaller than the lower limit value, the product of which the measured characteristic value belongs to any one of the ranges, the product of which the measured characteristic value belongs to the range from the upper limit value to a predetermined value greater than the upper limit value and the product of which the measured characteristic value belongs to the range from the lower limit value to a predetermined value smaller than the lower limit value, or the product of which the measured characteristic value belongs to any one of the ranges is re-measured, and whether or not the product is a non-defective article is re-determined with the inspection standard as a reference based on the re-measured characteristic value. Therefore, the product belonging to each range is again inspected, and the percentage (non-defective article rate) of being determined as a non-defective article is enhanced.

In the fifth invention, the twelfth invention, and the nineteenth invention, the predetermined value smaller or greater than the upper limit value is smaller or greater than the upper limit value by three times the measurement value standard deviation, and the predetermined value greater or smaller than the lower limit value is greater or smaller than the lower limit value by three times the measurement value standard deviation. Therefore, the number of the products belonging to the range in which the characteristic values of the products are to be re-measured and re-determined can be limited.

In the sixth invention, the thirteenth invention, and the twentieth invention, the probability distribution of the calculated product standard deviation is divided into a plurality of zones, the probability that a product belonging to a zone out of the product standard is mistakenly determined as a product belonging to a zone within the product standard is calculated as the consumer risk and the probability that a product belonging to a zone within the product standard is mistakenly determined as a product belonging to a zone out of the product standard is calculated as the producer risk, assuming that the probability distribution in each of the zones follows the probability distribution of the measurement value standard deviation. Therefore, the consumer risk and the producer risk can be calculated without mathematically solving a double integral equation.

In the seventh invention, the fourteenth invention, and the twenty-first invention, the variables of the probability distribution of the deemed standard deviation are changed such that the number of the products re-classified as non-defective articles or the number of the products re-classified as defective articles when re-classified at least once and the estimated number of the products re-classified as non-defective articles or defective articles substantially match each other, and the changed variables are calculated as the standard deviation of the characteristic value variation of the products and the measurement value standard deviation. Therefore, the standard deviation of the characteristic value variation and the measurement value standard deviation can be calculated without using the method of evaluating uncertainty or the method of measurement system analysis (MSA).

In the product inspection device, the product inspection method, and the computer program according to the present invention, the inspection standard is changed based on at least one of the calculated consumer risk or the calculated producer risk, and whether or not all the products contained in the product lot are non-defective articles is determined with the changed inspection standard as a reference. Therefore, the product lot can be managed such that at least one of the consumer risk or the producer risk is always smaller than or equal to a predetermined value.

In the product inspection device, the product inspection method, and the computer program according to the present invention, whether or not the product lot is a non-defective lot is determined based on at least one of the calculated consumer risk or the calculated producer risk, so that it is possible to prevent the shipment of the product lot of which at least one of the consumer risk or the producer risk becomes smaller than or equal to a predetermined value.

DETAILED DESCRIPTION OF THE INVENTION

Hereinafter, a product inspection device capable of inspecting products based on a consumer risk and a producer risk in an embodiment of the present invention will be specifically described using the drawings. The invention defined in the Claims is not limited by the following embodiments, and it should be recognized that not all combinations of the characteristic matters described in the embodiments are essential matters for solving the problems.

In the following embodiments, a product inspection device in which a computer program is introduced to a computer system will be described, but it should be apparent to those skilled in the art that the present invention can have one part implemented as a computer executable computer program. Therefore, the present invention may take an embodiment serving as hardware of the product inspection device, an embodiment serving as software, or an embodiment of a combination of software and hardware. The computer program can be recorded on an arbitrary computer readable recording medium such as a hard disc, a DVD, a CD, an optical storage device, or a magnetic storage device.

First Embodiment

Figure 1:
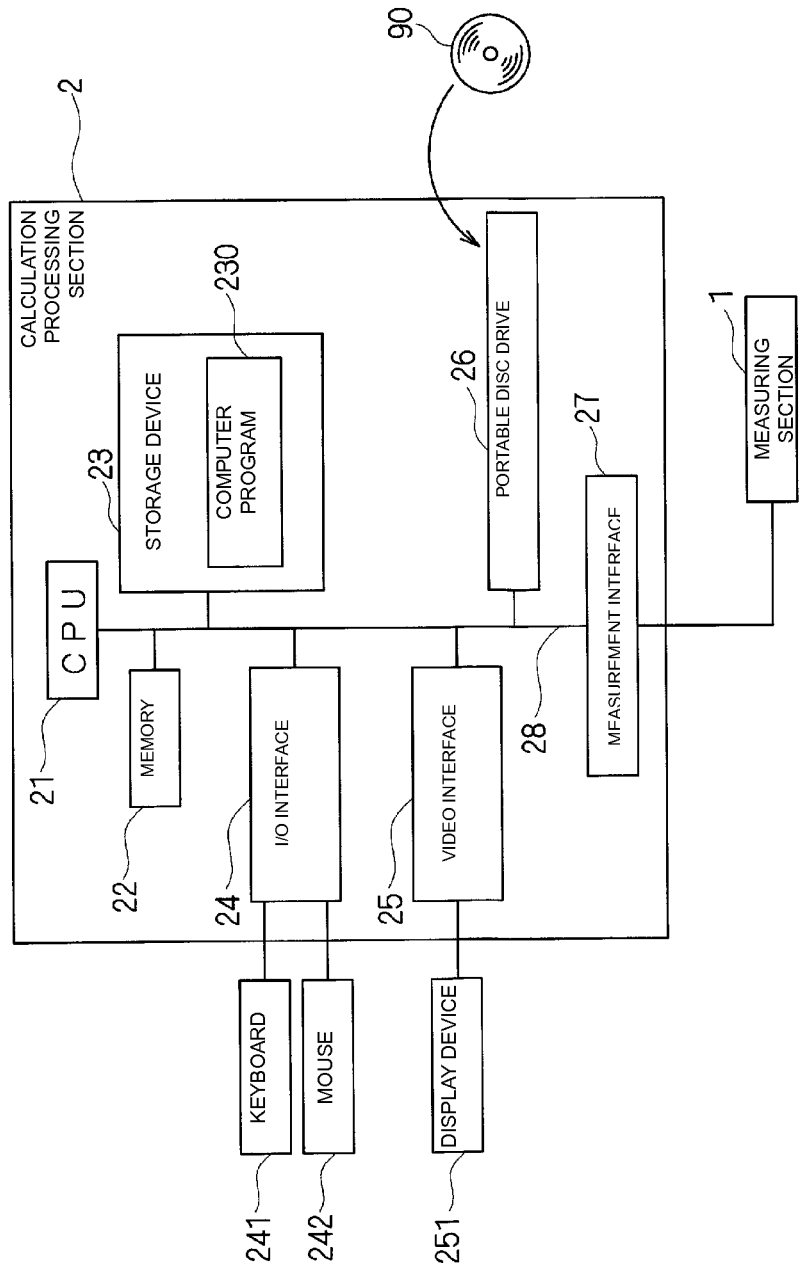
FIG. 1 is a block diagram showing a configuration example of a product inspection device according to a first embodiment of the present invention.

FIG. 1 is a block diagram showing a configuration example of a product inspection device according to a first embodiment of the present invention. The product inspection device according to the first embodiment includes a measuring section 1 for measuring a characteristic value indicating predetermined characteristics of a product, and a calculation processing section 2 for calculating the measured characteristic value.

The measuring section 1 measures the characteristic value indicating predetermined characteristics of the product. For instance, if the product is a ceramic capacitor, the measuring section 1 measures a condenser capacity, which is the characteristic value of the product. The hardware configuration of the measuring section 1 for measuring the condenser capacity includes an LCR meter.

The calculation processing section 2 is configured at least by a CPU (Central Processing Unit) 21, a memory 22, a storage device 23, an I/O interface 24, a video interface 25, a portable disc drive 26, a measurement interface 27, and an internal bus 28 for connecting such hardware.

The CPU 21 is connected to each portion of hardware described above in the calculation processing section 2 through the internal bus 28 to control the operation of each portion of hardware and execute various software functions according to a computer program 230 stored in the storage device 23. The memory 22 is configured by a volatile memory such as a SRAM or a SDRAM, where a load module is developed at the time of execution of the computer program 230 and stores temporary data and the like generated at the time of the execution of the computer program 230.

The storage device 23 is configured by a built-in fixed storage device (hard disc), a ROM, or the like. The computer program 230 stored in the storage device 23 is downloaded from a portable recording medium 90 such as a DVD or a CD-ROM, on which information such as program and data is recorded, by the portable disc drive 26, and developed from the storage device 23 to the memory 22 and then executed at the time of the execution. It may, of course, be a computer program downloaded from an external computer connected to a network.

The measurement interface 27 is connected to the internal bus 28 and to the measuring section 1, so that the measured characteristic value, the control signal, and the like can be transmitted and received between the measuring section 1 and the calculation processing section 2.

The I/O interface 24 is connected to a data input medium such as a keyboard 241 or a mouse 242 to receive the input of data. The video interface 25 is connected to a display device 251 such as a CRT monitor or an LCD to display a predetermined image.

Figure 2:
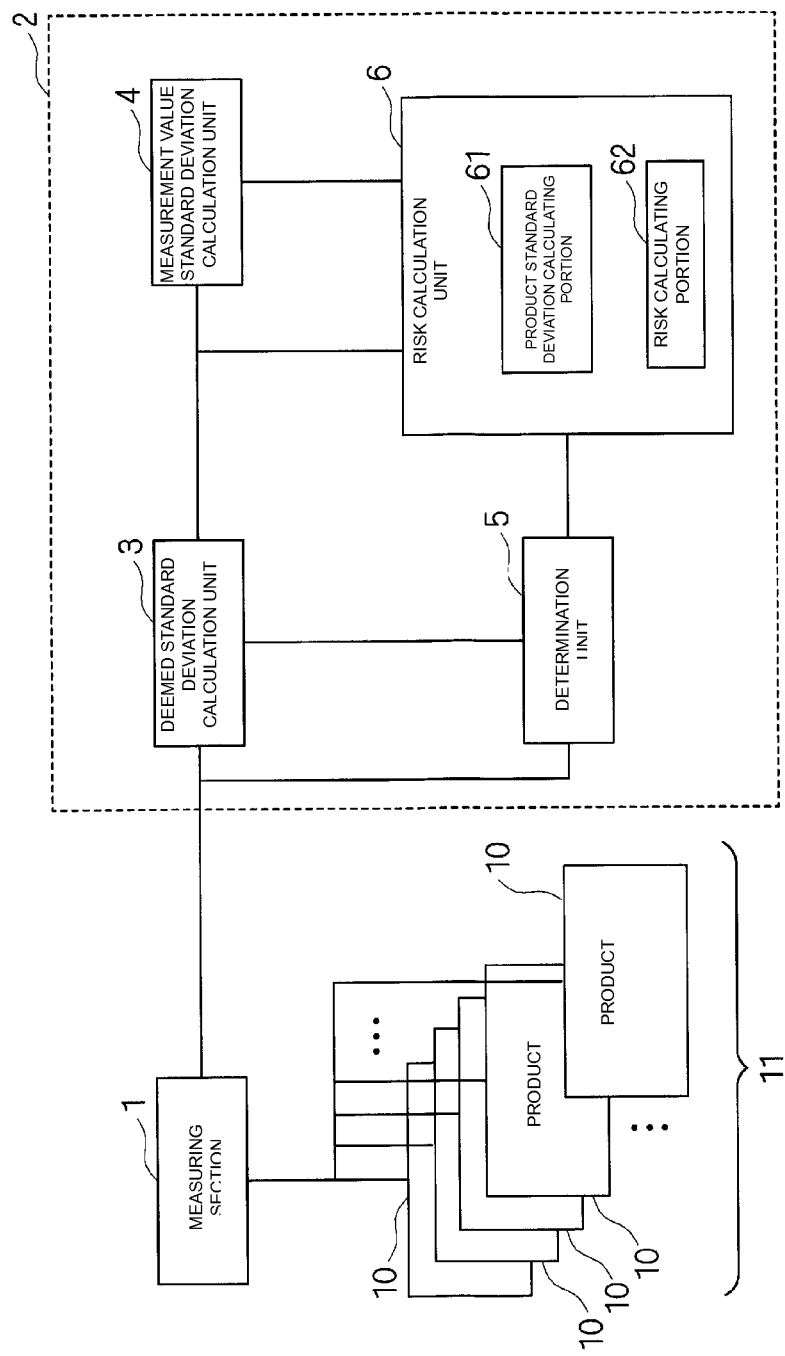
FIG. 2 is a functional block diagram of the product inspection device according to the first embodiment of the present invention.

The operation of the product inspection device configured as above will be described below. FIG. 2 is a functional block diagram of the product inspection device according to the first embodiment of the present invention. The measuring section 1 measures the characteristic value indicating predetermined characteristics of a product 10. A product lot 11 is configured to include a predetermined number of the products 10 as one unit.

A deemed standard deviation calculation unit 3 calculates a standard deviation of variation in the characteristic values of measuring some of the products 10 contained in the product lot 11 as a deemed standard deviation. For instance, if the product lot 11 includes a 100 thousand products 10, the measuring section 1 samples 10000 products 10 from the product lot 11 to measure the characteristic values of the products 10, and the deemed standard deviation calculation unit 3 calculates the standard deviation of the variation in the measured characteristic values as the deemed standard deviation. The deemed standard deviation calculation unit 3 can calculate the deemed standard deviation and can also calculate an average value of the measured characteristic values of the products 10.

A measurement value standard deviation calculation unit 4 calculates a standard deviation of variation in the measurement values indicating the variation in the measurement result of the measuring section 1 itself as a measurement value standard deviation through a predetermined method before measuring the product lot 11. The method of calculating the standard deviation of the variation in the measurement value includes a method of evaluating uncertainty, a method of measurement system analysis MSA defined in particular requirements (ISO/TS 16949) for automotive production and relevant service part organizations of quality management systems (ISO 9001:2000) of the ISO standard, and the like.

The method of evaluating uncertainty divides the system of the measuring section 1 into elements in which uncertainty occurs such as a measurement jig, a sensor, or the like, and evaluates the uncertainty for every element to calculate the standard deviation of the variation in the measurement value or the uncertainty of the entire system of the measuring section 1. The method of measurement system analysis MSA calculates the standard deviation of the variation in the measurement value using the GR & R (Gage Repeatability and Reproducibility) method.

A deemed standard deviation TV calculated in the deemed standard deviation calculation unit 3 can be expressed as (equation 1) with a product standard deviation PV or a standard deviation of the variation in the characteristic values (characteristic value variation) of the products themselves, and a measurement value standard deviation GRR calculated in the measurement value standard deviation calculation unit 4.

$$TV^2 = PV^2 + GRR^2 \qquad \text{[Equation 1]}$$

Figure 3:
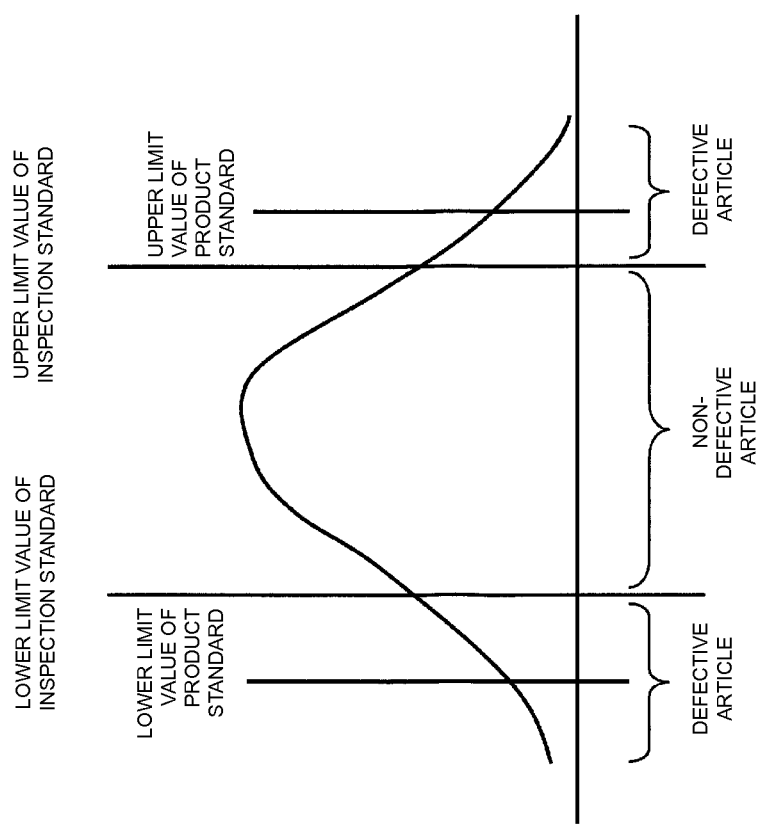
FIG. 3 is a schematic view showing a probability distribution in a case where the product inspection device according to the first embodiment of the present invention measures characteristic values of a plurality of products.

A determination unit 5 determines whether or not the product 10 is a non-defective article based on whether or not the characteristic value measured in the measuring section 1 is within a range smaller than or equal to the upper limit value and greater than or equal to the lower limit value defined in the inspection standard. FIG. 3 is a schematic view showing a probability distribution in a case where the product inspection device according to the first embodiment of the present invention measured the characteristic values of a plurality of products 10. FIG. 3 shows the probability distribution of the measured characteristic value of the product 10 with the horizontal axis as the characteristic value of the product 10 and the vertical axis as the number of the products 10, where the probability distribution of the measured characteristic value of the product 10 is a normal distribution.

Furthermore, FIG. 3 shows the upper limit value (upper limit value of inspection standard) and the lower limit value (lower limit value of inspection standard) of the characteristic value defined in the inspection standard. The determination unit 5 determines the product 10 belonging to the range smaller than or equal to the upper limit value and greater than or equal to the lower limit value of the inspection standard as a non-defective article, and the product 10 belonging to the range greater than the upper limit value and a range smaller than the lower limit value of the inspection standard as a defective article. In FIG. 3, the upper limit value (upper limit value of product standard) and the lower limit value (lower limit value of product standard) of the characteristic value defined in the product standard, in which the condition is more lenient than the inspection standard, are also shown, where the upper limit value of the product standard is greater than the upper limit value of the inspection standard and the lower limit value of the product standard is smaller than the lower limit value of the inspection standard since the condition of the product standard is more lenient than that of the inspection standard.

A risk calculation unit 6 calculates a consumer risk indicating the probability that the product out of the product standard is mistakenly determined as a non-defective article based on the inspection standard in the determination unit 5 by the variation in the measurement value, and a producer risk indicating the probability that the product within the product standard is mistakenly determined as a defective article based on the inspection standard in the determination unit 5 by the variation in the measurement value. Specifically, the method of calculating the consumer risk CR and the producer risk PR includes calculating by solving (equation 2) and (equation 3) disclosed in Non-Patent Document 2, respectively.

$$CR = \frac{1}{2\pi} \cdot \int_{-\infty}^{-L} \int_{-R(t+k\cdot L)}^{-R(t-k\cdot L)} e^{-\frac{(t-u)^2+(s-v)^2}{2}} ds\, dt +$$
$$\frac{1}{2\pi} \cdot \int_{L}^{\infty} \int_{-R(t+k\cdot L)}^{-R(t-k\cdot L)} e^{-\frac{(t-u)^2+(s-v)^2}{2}} ds\, dt \quad \text{[Equation 2]}$$

$$PR = \frac{1}{2\pi} \cdot \int_{-L}^{L} \int_{-\infty}^{-R(t+k\cdot L)} e^{-\frac{(t-u)^2+(s-v)^2}{2}} ds\, dt +$$
$$\frac{1}{2\pi} \cdot \int_{-L}^{L} \int_{-R(t-k\cdot L)}^{\infty} e^{-\frac{(t-u)^2+(s-v)^2}{2}} ds\, dt \quad \text{[Equation 3]}$$

If the probability distribution of the characteristic value variation of the products 10 and the probability distribution of the measurement value variation of the measuring section 1 are normal distributions, (equation 2) and (equation 3) are expressed in the form of double integral of a probability density function of the characteristic value variation of the products 10 in which the reference normal distribution is obtained by the product standard deviation PV of the product 10 and a probability density function of the measurement value variation in which the reference normal distribution is obtained by the measurement value standard deviation GRR of the measuring section 1. Here, t is a position from the center of the probability distribution of the characteristic value variation of the products 10, s is a position from the center of the probability distribution of the measurement value variation of the measuring section 1, L is a half bandwidth of the product standard (when center of product standard of the product 10 is zero, distance from zero to the upper limit value or the lower limit value of the product standard of the product 10), k·L is a half bandwidth of the inspection standard (when center of inspection standard of the product 10 is zero, distance from zero to the upper limit value or the lower limit value of the inspection standard of the product 10), u is a bias of the probability distribution of the characteristic value variation of the products 10, v is a bias of the probability distribution of the measurement value variation of the measuring section 1, and R is an accuracy ratio (value obtained by dividing the product standard deviation PV of the product 10 by the measurement value standard deviation GRR of the measuring section 1).

As it is difficult to mathematically solve the double integral equation of (equation 2) and (equation 3), the consumer risk CR and the producer risk PR are calculated using a product standard deviation calculating portion 61 and a risk calculating portion 62 in the product inspection device according to the first embodiment. The product standard deviation calculating portion 61 calculates the product standard deviation PV by (equation 1) based on the deemed standard deviation TV and the measurement value standard deviation GRR. The risk calculating portion 62 divides the probability distribution of the calculated product standard deviation PV into plural zones, and assuming that the probability distribution in each zone follows the probability distribution of the measurement value standard deviation GRR, calculates the probability that the product 10 belonging to a zone, in which the measured characteristic value is in a range greater than the upper limit value or a range smaller than the lower limit value defined in the product standard, is mistakenly determined as a product (non-defective article) belonging to the zone within the product standard as the consumer risk CR, and calculates the probability that the product 10 belonging to a zone, in which the measured characteristic value is in a range smaller than or equal to the upper limit value and greater than or equal to the lower limit value defined in the product standard, is mistakenly determined as a product (defective article) belonging to the zone out of the product standard as the producer risk PR.

Figure 4:
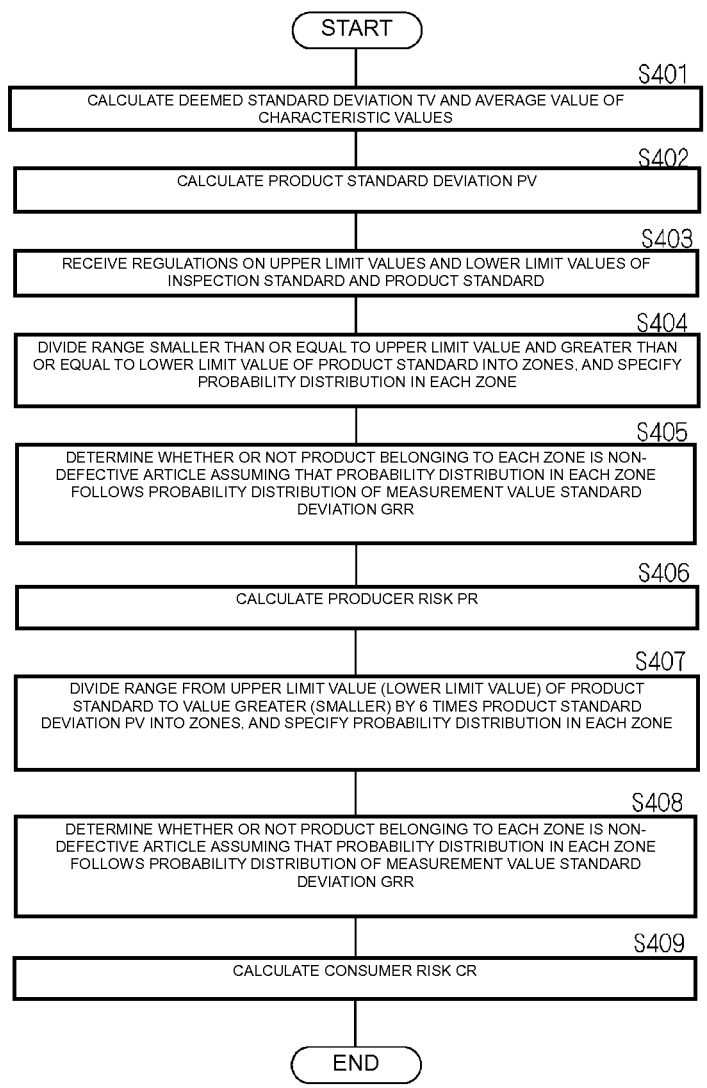
FIG. 4 is a flowchart showing a processing procedure in which a risk calculation unit of the product inspection device according to the first embodiment of the present invention calculates a consumer risk CR and a producer risk PR.

Specifically, the processing procedure in which the risk calculation unit 6 calculates the consumer risk CR and the producer risk PR in the product inspection device according to the first embodiment will be described using a flowchart. FIG. 4 is a flowchart showing a processing procedure in which the risk calculation unit 6 of the product inspection device according to the first embodiment of the present invention calculates the consumer risk CR and the producer risk PR.

The CPU 21 of the calculation processing section 2 calculates the deemed standard deviation TV and the average value of the characteristic values (step S401) from the characteristic values of some of the products 10 contained in the product lot 11 measured in the measuring section 1 and received through the measurement interface 27, and substitutes the calculated deemed standard deviation and the measurement value standard deviation GRR to (equation 1) to calculate the product standard deviation PV (step S402). The CPU 21 receives the definitions for the upper limit value and the lower limit value of the inspection standard and the product standard (step S403).

The CPU 21 divides the range smaller than or equal to the upper limit value and greater than or equal to the lower limit value of the product standard of the probability distribution to 200 zones assuming that the probability distribution of the calculated product standard deviation PV as the normal distribution, and specifies the probability distribution in each zone (step S404). Assuming that the probability distribution in each zone follows the measurement value standard deviation GRR, the CPU 21 determines whether or not the product 10 belonging to each zone is a non-defective article based on the inspection standard (step S405). The CPU 21 calculates the probability that the product 10 belonging to the range smaller than or equal to the upper limit value and greater than or equal to the lower limit value of the product standard is determined as the product 10 belonging to the range greater than the upper limit value or the range smaller than the lower limit value of the inspection standard in step S405 as the producer risk PR (step S406).

Figure 5:
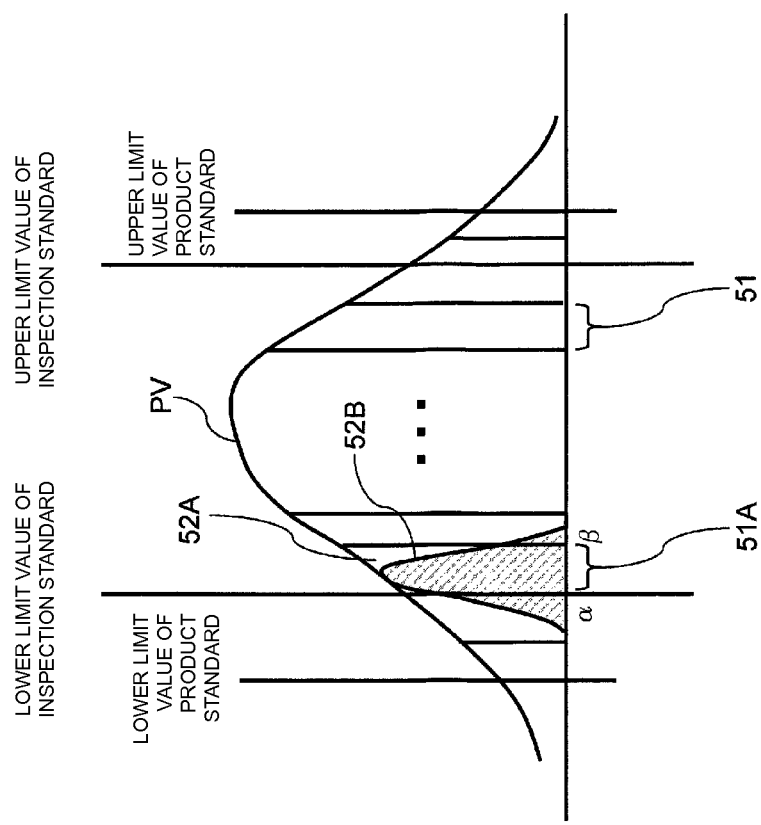
FIG. 5 is a schematic view showing a state in which the probability distribution in each zone of a product standard deviation PV follows the probability distribution of a measurement value standard deviation GRR.

The assumption that the probability distribution in each zone follows the probability distribution of the measurement value standard deviation GRR will be described using the drawings. FIG. 5 is a schematic view showing a state in which the probability distribution in each zone of the product standard deviation PV follows the probability distribution of the measurement value standard deviation GRR. As shown in FIG. 5, the probability distribution of the product standard deviation PV has a range smaller than or equal to the upper limit value and greater than or equal to the lower limit value of the product standard divided into 200 zones 51. For instance, the product 10 having the characteristic value from the characteristic value a to the characteristic value β exists in a zone 51A from the characteristic value a to the characteristic value β, but the product 10 having the characteristic value smaller than the characteristic value a or the characteristic value greater than the characteristic value β does not exist. Assuming that a probability distribution 52A of the zone 51A after measurement follows the probability distribution of the measurement value standard deviation GRR, the respective characteristic values of the products 10 belonging to the zone 51A has measurement value variation, and the probability distribution 52A of the zone 51A can be presumed as the assumed probability distribution 52B. In the assumed probability distribution 52B, the product 10 having the characteristic value smaller than the characteristic value a or the characteristic value greater than the characteristic value β also exists. The CPU 21 determines whether or not the product 10 belonging to each zone 51 is a non-defective article based on the inspection standard presuming the probability distribution in each zone 51 is the assumed probability distribution. The product 10 belonging to each zone 51 determined as a defective article based on the inspection standard is the product 10 within the product standard but the product 10 determined as a defective article based on the inspection standard, and hence the probability of being determined as the relevant product 10 can be calculated as the producer risk PR.

Returning back to FIG. 4, the CPU 21 of the calculation processing section 2 divides the range from the upper limit value (lower limit value) of the product standard to a value 6 times greater (smaller) than the product standard deviation PV into 200 zones with the probability distribution of the calculated product standard deviation PV as the normal distribution (step S407). The CPU 21 assumes that the probability distribution in each zone after measurement follows the probability distribution of the measurement value standard deviation GRR as shown in FIG. 5, and determines whether or not the product 10 belonging to each zone is a non-defective article based on the inspection standard (step S408). The CPU 21 calculates the probability that the product 10 belonging to the range greater than the upper limit value of the product standard or the product 10 belonging to the range smaller than the lower limit value is determined as the product 10 belonging to the range smaller than or equal to the upper limit value and greater than or equal to the lower limit value of the inspection standard in step S408 as the consumer risk CR (step S409).

The calculated consumer risk CR and the producer risk PR can be % displayed, ppm (parts per million) displayed, and ppb (parts per billion) displayed.

In the product inspection device according to the first embodiment, the upper limit value and the lower limit value of the inspection standard for carrying out the determination on whether or not all the products 10 contained in the product lot 11 are non-defective articles in the determination unit 5 can be changed based on the consumer risk CR calculated in the risk calculation unit 6.

Figure 6:
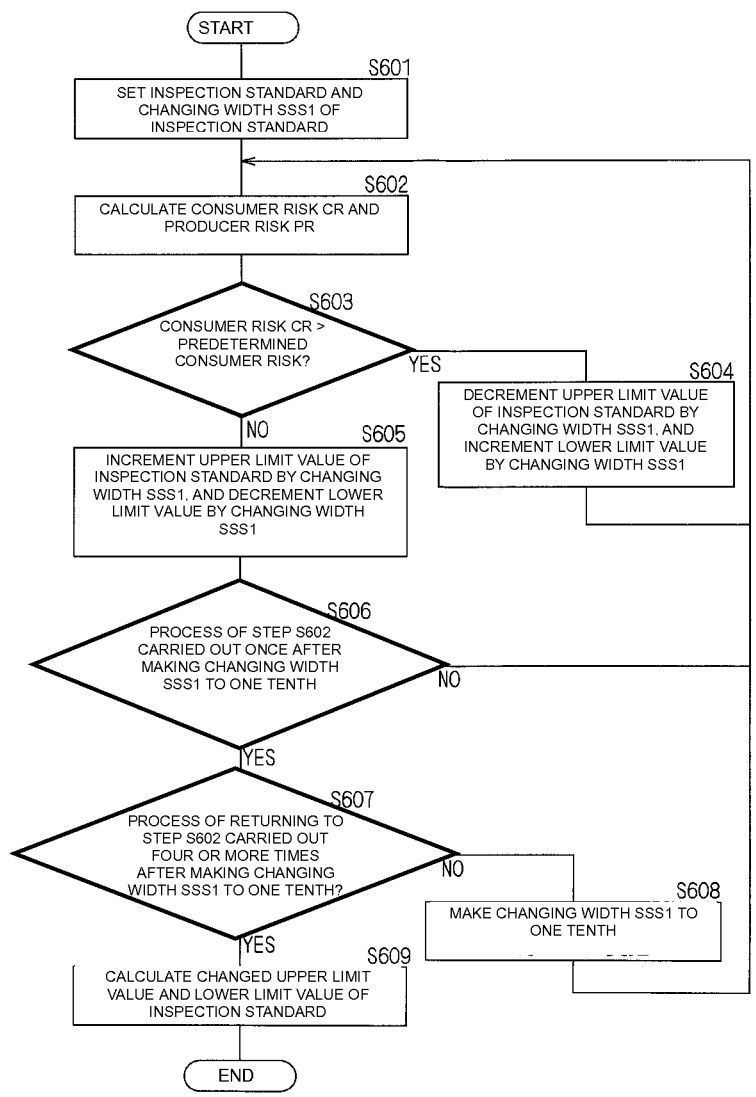
FIG. 6 is a flowchart showing a processing procedure in which a determination unit of the product inspection device according to the first embodiment of the present invention changes an upper limit value and a lower limit value of an inspection standard.

Specifically, in the product inspection device according to the first embodiment, the processing procedure in which the determination unit 5 changes the upper limit value and the lower limit value of the inspection standard will be described using a flowchart. FIG. 6 is a flowchart showing the processing procedure in which the determination unit 5 of the product inspection device according to the first embodiment of the present invention changes the upper limit value and the lower limit value of the inspection standard.

The CPU 21 of the calculation processing section 2 sets the range of one half from the upper limit value to the lower limit value of the product standard as a range smaller than or equal to the upper limit value and greater than or equal to the lower limit value of the inspection standard, and a range of one twentieth from the upper limit value to the lower limit value of the product standard as a changing width SSS1 of the inspection standard, respectively, (step S601). A median value from the upper limit value to the lower limit value of the product standard, and a median value from the upper limit value to the lower limit value of the inspection standard are to match.

The CPU 21 calculates the consumer risk CR and the producer risk PR using the processes shown in FIG. 4 based on the inspection standard set in step S601 (step S602).

The CPU 21 determines whether or not the consumer risk CR calculated in step S602 is greater than a predetermined consumer risk defined when inspecting the characteristic value of the product 10 and shipping the product 10 (step S603). If the CPU 21 determines that the calculated consumer risk CR is greater than a predetermined consumer risk (step S603: YES), the CPU 21 decrements the upper limit value of the inspection standard by the changing width SSS1, and increments the lower limit value by the changing width SSS1 (step S604) and returns the process to step S602. The CPU 21 determines that the calculated consumer risk CR is smaller than or equal to a predetermined consumer risk (step S603: NO), the CPU 21 increments the upper limit value of the inspection standard by the changing width SSS1, and decrements the lower limit value by the changing width SSS1 (step S605).

The CPU 21 determines whether or not the process of step S602 was carried out once after making the changing width SSS1 to one tenth (step S606). If the CPU 21 determines that the process of step S602 was not carried out even once (step S606: NO), the CPU 21 returns the process to step S602. If the CPU 21 determines that the process of step S602 was carried out once (step S606: YES), the CPU 21 determines whether or not the process of returning to step S602 was carried out four or more times after making the changing width SSS1 to one tenth (step S607).

If the CPU 21 determines that the process of returning to step S602 was carried out only a number of times less than four times after making the changing width SSS1 to one tenth (step S607: NO), the CPU 21 changes the changing width SSS1 to one tenth (step S608), and returns the process to step S602. If the CPU 21 determines that the process of returning to step S602 was carried out four or more times after making the changing width SSS1 to one tenth (step S607: YES), the CPU 21 calculates the value in which the upper limit value of the inspection standard is made small by one half of the changing width SSS1 as the changed upper limit value of the inspection standard, and the value in which the lower limit value is made large by one half of the changing width SSS1 as the changed lower limit value of the inspection standard (step S609).

For instance, when the capacitor having the condenser capacity of 1.5 pF is the product 10, if the measurement value standard deviation GRR obtained in the measurement value standard deviation calculation unit 4 in advance is 0.0021 pF, 10000 products 10 are sampled from the product lot 11 including 100000 products 10, where the product standard deviation PV calculated by measuring the condenser capacity or the characteristic value of the product 10 is 0.014 pF and the average value of the characteristic values is 1.502 pF. In this case, the consumer risk CR is calculated as 0.008 ppm and the producer risk PR is calculated as 32.70% if the upper limit value of the product standard is 1.52 pF, the lower limit value is 1.48 pF, the upper limit value of the initial inspection standard is 1.51 pF, and the lower limit value is 1.49 pF. If a predetermined consumer risk of the product 10 is set to be smaller than or equal to 2 ppm, the consumer risk CR of the product lot 11 satisfies a predetermined consumer risk as it is estimated as 0.008 ppm. However, the estimated non-defective article rate is a small value or 51.57% since the producer risk PR is too large. Thus, the producer risk PR can be reduced and the non-defective article rate can be improved by changing the inspection standard such that the consumer risk CR becomes closer to the predetermined consumer risk as much as possible.

If the consumer risk CR calculated with the initial inspection standard is 0.008 ppm significantly smaller than the predetermined consumer risk of 2 ppm, the CPU 21 of the calculation processing section 2 calculates the inspection standard such that the consumer risk CR becomes closer to the predetermined consumer risk of 2 ppm as much as possible according to the flowchart shown in FIG. 6. The calculated inspection standard has the upper limit value of 1.51255 pF and a lower limit value of 1.48745 pF, and the consumer risk CR to be calculated becomes 1.98 ppm, and hence the producer risk PR becomes small or 22.28% and the non-defective article rate improves to 61.99%.

Therefore, in the product inspection device according to the first embodiment, the upper limit value and the lower limit value of the inspection standard can be changed based on the consumer risk CR by carrying out the processes described above, and hence the inspection standard can be set such that the consumer risk CR of the product lot 11 becomes smaller than or equal to a predetermined consumer risk defined when inspecting the characteristic value of the product 10 and shipping the product 10. Furthermore, in the product inspection device according to the first embodiment, the consumer risk CR of the product lot 11 can be managed so as to always be smaller than or equal to a predetermined consumer risk.

It should be recognized that the first embodiment described above can be changed within a scope not deviating from the purpose of the present invention. For instance, not limited to the case of changing the upper limit value and the lower limit value of the inspection standard based only on the consumer risk, the upper limit value and the lower limit value of the inspection standard may be changed based on only the producer risk, or on both the consumer risk and the producer risk.

Second Embodiment

In a product inspection device according to a second embodiment, whether or not the product lot 11 is a non-defective lot is determined based on the calculated consumer risk CR. The block diagram showing the configuration example of the product inspection device according to the second embodiment is the same as the block diagram showing the configuration example shown in FIG. 1 of the first embodiment, and thus the detailed description will be omitted.

Figure 7:
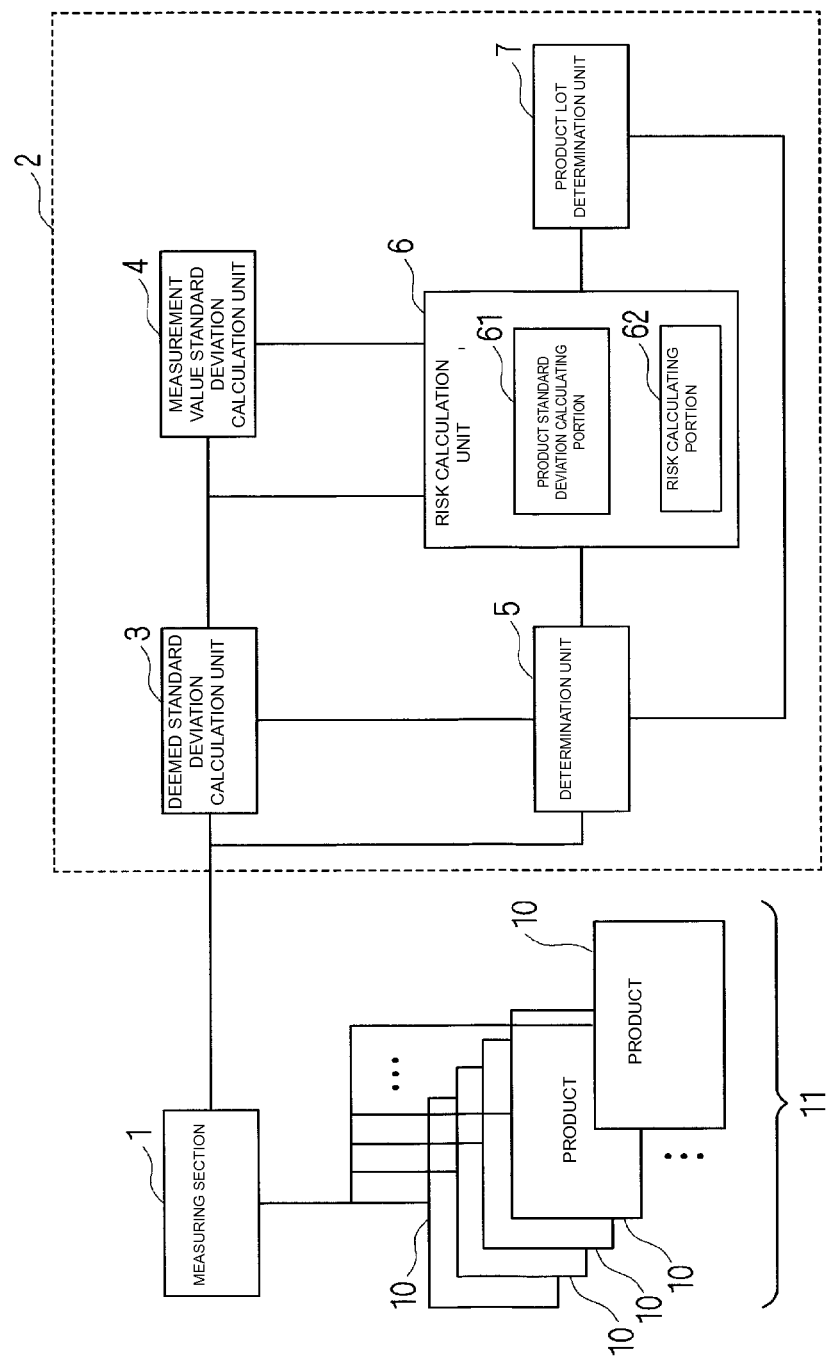
FIG. 7 is a functional block diagram of a product inspection device according to a second embodiment of the present invention.

The operation of the product inspection device according to the second embodiment will be described. FIG. 7 is a functional block diagram of the product inspection device according to the second embodiment of the present invention. The measuring section 1 measures the characteristic value indicating predetermined characteristics of a product 10. A product lot 11, which is one unit, is configured to include a predetermined number of the products 10.

The deemed standard deviation calculation unit 3 calculates a standard deviation of variation in the characteristic value of measuring all the products 10 contained in the product lot 11 as a deemed standard deviation. The deemed standard deviation calculation unit 3 can calculate the deemed standard deviation and can also calculate an average value of the measured characteristic values of the products 10.

The measurement value standard deviation calculation unit 4 calculates a standard deviation of variation in the measurement values indicating the variation in the measurement result of the measuring section 1 itself as a measurement value standard deviation before measuring the product lot 11. The method of calculating the standard deviation of the measurement value variation includes a method of evaluating uncertainty, a method of measurement system analysis MSA, and the like.

The deemed standard deviation TV calculated in the deemed standard deviation calculation unit 3 can be expressed as (equation 1) with a product standard deviation PV or a standard deviation of the variation in the characteristic values of the products themselves, and a measurement value standard deviation GRR calculated in the measurement value standard deviation calculation unit 4.

The determination unit 5 determines whether or not all the products 10 contained in the product lot 11 are non-defective articles based on whether or not the characteristic value measured in the measuring section 1 is within a range smaller than or equal to the upper limit value and greater than or equal to the lower limit value defined in the inspection standard.

The risk calculation unit 6 calculates a consumer risk CR indicating the probability that the product out of the product standard is mistakenly determined as a non-defective article based on the inspection standard in the determination unit 5, and a producer risk PR indicating the probability of the product within the product standard is mistakenly determined as a defective article based on the inspection standard in the determination unit 5. The product inspection device according to the second embodiment as well, the consumer risk CR and the producer risk PR are calculated using the product standard deviation calculating portion 61 and the risk calculating portion 62. The consumer risk CR and the producer risk PR are calculated through the processing procedure shown in FIG. 4 of the first embodiment.

A product lot determination unit 7 determines that the product lot 11 is a non-defective lot if the consumer risk CR calculated in the risk calculation unit 6 is smaller than or equal to a predetermined consumer risk defined when inspecting the characteristic value of the product 10 and shipping the product 10, and determines that the product lot 11 is a defective lot if the consumer risk CR is greater than a predetermined consumer risk.

Figure 8:
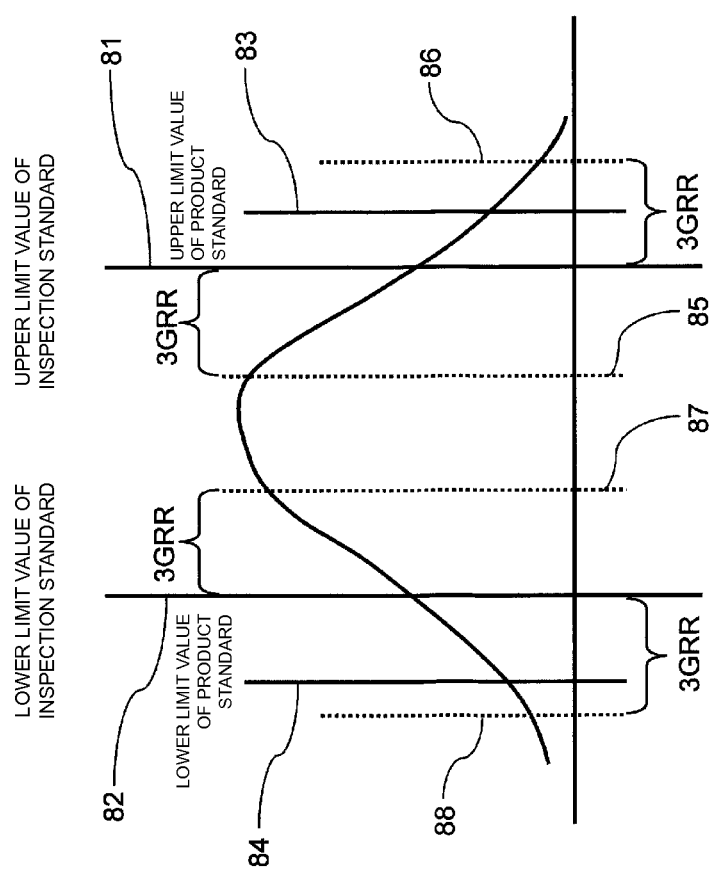
FIG. 8 is a schematic view showing a probability distribution in a case where the product inspection device according to the second embodiment of the present invention measures characteristic values of a plurality of products.

Furthermore, if the product lot 11 is determined as a defective lot in the product lot determination unit 7, the determination unit 5 re-determines whether or not all the products 10 are non-defective articles based on the characteristic values of re-measuring in the measuring section 1 all the products 10 (non-defective articles) belonging to the range smaller than or equal to the upper limit value and greater than or equal to the lower limit value of the inspection standard. The products 10 to be re-determined are not limited to all the products 10 belonging to the range smaller than or equal to the upper limit value and greater than or equal to the lower limit value of the inspection standard, and may be products 10 belonging to the range from the upper limit value of the inspection standard to a value smaller by three times the measurement value standard deviation GRR than the upper limit value, or the range from the lower limit value of the inspection standard to a value greater by three times the measurement value standard deviation GRR than the lower limit value. The product 10 to re-determine will be specifically described using the drawings. FIG. 8 is a schematic view showing a probability distribution in a case where the product inspection device according to the second embodiment of the present invention measured the characteristic values of a plurality of products 10. FIG. 8 shows the probability distribution of the measured characteristic value of the product 10 with the horizontal axis as the characteristic value of the product 10 and the vertical axis as the number of the products 10, where the probability distribution of the measured characteristic value of the product 10 is a normal distribution. In FIG. 8, an upper limit value 81 and a lower limit value 82 of the inspection standard, an upper limit value 83 and a lower limit value 84 of the product standard, a value 85 smaller by three times the measurement value standard deviation GRR than the upper limit value 81 and a value 86 greater by three times the measurement value standard deviation GRR, as well as a value 87 greater by three times the measurement value standard deviation GRR than the lower limit value 82 and a value 88 smaller by three times the measurement value standard deviation GRR are indicated. That is, as shown in FIG. 8, the product 10 to re-determine may be all the products 10 belonging to the range from the upper limit value 81 to the lower limit value 82 of the inspection standard, the product 10 belonging to the range from the upper limit value 81 to the value 85 and the product 10 belonging to the range from the lower limit value 82 to the value 87, or the product 10 belonging to any one of the ranges.

Furthermore, if the product lot 11 is determined as a non-defective lot in the product lot determination unit 7, the determination unit 5 re-determines whether or not all the products 10 are non-defective articles based on the characteristic values of re-measuring in the measuring section 1 the products 10 (defective articles) belonging to the range greater the upper limit value and a range smaller than the lower limit value of the inspection standard. The products 10 to be re-determined are not limited to all the products 10 belonging to the range greater than the upper limit value and smaller than the lower limit value of the inspection standard, and may be products 10 belonging to the range from the upper limit value 81 of the inspection standard to a value 86 greater by three times the measurement value standard deviation GRR than the upper limit value 81 and the products 10 belonging to the range from the lower limit value 82 to a value 88 smaller by three times the measurement value standard deviation GRR than the lower limit value 82, or the product belonging to one of the ranges, the products 10 belonging to the range from the upper limit value of the inspection standard to the upper limit value of the product standard and the products 10 belonging to the range from the lower limit value of the inspection standard to the lower limit value of the product standard, or the products 10 belonging to one of the ranges. That is, as shown in FIG. 8, the product 10 to re-determine may be the product 10 belonging to the range greater than the upper limit value 81 of the inspection standard and the product 10 belonging to the range smaller than the lower limit value 82, or the product 10 belonging to any one of the ranges, the product 10 belonging to the range from the upper limit value 81 to the upper limit value 83 and the product 10 belonging to the range from the lower limit value 82 to the lower limit value 84, or the product 10 belonging to any one of the ranges, the product 10 belonging to the range from the upper limit value 81 to the value 86 and the product 10 belonging to the range from the lower limit value 82 to the value 88, or the product 10 belonging to one of the ranges.

Figure 9:
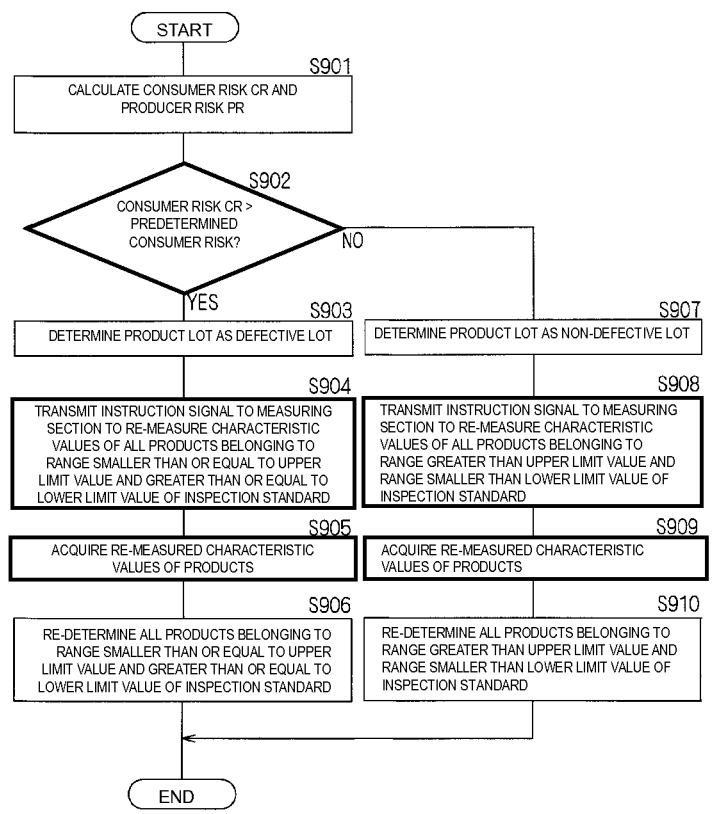
FIG. 9 is a flowchart showing a processing procedure in which a determination unit and a product lot determination unit of the product inspection device according to the second embodiment of the present invention determine whether or not a product lot is a non-defective lot based on a consumer risk CR, and re-determine the products.

Specifically, the processing procedure in which the determination unit 5 and the product lot determination unit 7 determine whether or not the product lot 11 is a non-defective lot based on the consumer risk CR, and re-determine the product 10 in the product inspection device according to the second embodiment will be described using a flowchart. FIG. 9 is a flowchart showing the processing procedure in which the determination unit 5 and the product lot determination unit 7 of the product inspection device according to the second embodiment of the present invention determine whether or not the product lot 11 is a non-defective lot based on the consumer risk CR, and re-determine the product 10.

The CPU 21 of the calculation processing section 2 calculates the consumer risk CR and the producer risk PR of the product lot 11 using the processes shown in FIG. 4 of the first embodiment based on the average value of the measured characteristic values, the deemed standard deviation TV, the measurement value standard deviation GRR, the product standard, and the inspection standard (step S901).

The CPU 21 determines whether or not the consumer risk CR calculated in step S901 is greater than a predetermined consumer risk defined when inspecting the characteristic value of the product 10 and shipping the product 10 (step S902). The CPU 21 determines that the calculated consumer risk CR is greater than the predetermined consumer risk (step S902: YES), the CPU 21 determines that the product lot 11 is a defective lot (step S903), and transmits an instruction signal to the measuring section 1 to re-measure the characteristic values of all the products 10 belonging to the range smaller than or equal to the upper limit value and greater than or equal to the lower limit value of the inspection standard (step S904). The measuring section 1 that received the instruction signal re-measures the characteristic values of all the products 10 belonging to the range smaller than or equal to the upper limit value and greater than or equal to the lower limit value of the inspection standard. The CPU 21 acquires the re-measured characteristic values of the product 10 (step S905), and re-determines whether or not all the products 10 belonging to the range smaller than or equal to the upper limit value and greater than or equal to the lower limit value of the inspection standard are non-defective articles based on the acquired characteristic values (step S906). If the CPU 21 determines that the calculated consumer risk CR is smaller than or equal to the predetermined consumer risk (step S902: NO), the CPU 21 determines that the product lot 11 is a non-defective lot (step S907), and transmits an instruction signal to the measuring section 1 to re-measure the characteristic values of all the products 10 belonging to the range greater than the upper limit value and the range smaller than the lower limit value of the inspection standard (step S908). The measuring section 1 that received the instruction signal re-measures the characteristic values of all the products 10 belonging to the range greater than the upper limit value and the range smaller than the lower limit value of the inspection standard. The CPU 21 acquires the re-measured characteristic values of the product 10 (step S909), and re-determines whether or not all the products 10 belonging to the range greater than the upper limit value and smaller than the lower limit value of the inspection standard are non-defective articles based on the acquired characteristic values (step S910).

For instance, when determining the product lot 11 in which the product 10 is a capacitor having a condenser capacity of 1.0 pF with the determination unit 5 once, and calculating the consumer risk CR with the risk calculation unit 6, if the upper limit value of the product standard is 1.02 pF, the lower limit value is 0.98 pF, the upper limit value of the inspection standard is 1.01 pF, the lower limit value is 0.99 pF, and the measurement value standard deviation GRR is 0.004 pF, the average value of the characteristic values is calculated as 1.0067 pF, the product standard deviation PV as 0.0209 pF, the consumer risk CR as 182.27 ppm, and the non-defective article rate as 34.52%.

If the condition is made stricter such as the upper limit value of the inspection standard is 1.00912 pF and the lower limit value is 0.99088 pF with respect to the same product lot 11, the consumer risk CR becomes smaller than 182.27 ppm. If the predetermined consumer risk defined when inspecting the characteristic value of the product 10 and shipping the product 10 is smaller than or equal to 182.27 ppm, the product inspection device according to the second embodiment determines the product lot 11 as a non-defective lot, re-measures the characteristic values of all the products 10 belonging to the range greater than the upper limit value and the range smaller than the lower limit value of the inspection standard, and re-determines based on the same inspection standard. The sum of the consumer risk CR of the product 10 determined as a non-defective article in the first determination and the consumer risk CR of the product 10 determined as a non-defective article in the second determination becomes 180.82 ppm, which is smaller than or equal to the predetermined consumer risk. The producer risk PR can be reduced and the non-defective article rate can be improved to 39.07% by re-measuring the characteristic value of the product 10 within the product standard determined as out of the inspection standard.

If the condition is made more lenient such as the upper limit value of the inspection standard is 1.01461 pF and the lower limit value is 0.98539 pF with respect to the same product lot 11, the consumer risk CR becomes greater than 182.27 ppm. If the predetermined consumer risk defined when inspecting the characteristic value of the product 10 and shipping the product 10 is smaller than or equal to 182.27 ppm, the product inspection device according to the second embodiment determines the product lot 11 as a defective lot, re-measures the characteristic values of all the products 10 belonging to the range smaller than or equal to the upper limit value and greater than or equal to the lower limit value of the inspection standard, and re-determines based on the same inspection standard. The consumer risk CR of the product 10 determined as a non-defective article in the first determination is 3678 ppm, but the consumer risk CR of the product 10 determined as a non-defective article in the second determination becomes 180.87 ppm, which is smaller than or equal to the predetermined consumer risk, by re-measuring the characteristic value of the product 10 out of the product standard defined as within the inspection standard. The non-defective article rate after the second determination also improves to 42.12% since the condition of the inspection standard is lenient.

Even if the condition is made stricter to the upper limit value of the inspection standard of 1.00957 pF and the lower limit value of 0.99043 pF with respect to the product lot 11, and the characteristic values of all the products 10 belonging to the range from the upper limit value of the inspection standard to the upper limit value of the product standard and the range from the lower limit value of the inspection standard to the lower limit value of the product standard are re-measured and re-determination is carried out based on the same inspection standard, the sum of the consumer risk CR of the product 10 determined as a non-defective article in the first determination and the consumer risk CR of the product 10 determined as a non-defective article in the second determination becomes 181.10 ppm, and the non-defective article rate improves to 40.28%. Through the processes described above, the number of the products 10 to re-determine can be reduced compared to when targeting all the products 10 belonging to the range greater than the upper limit value and the range smaller than the lower limit value of the inspection standard, and the non-defective article rate can be improved by 1.21%.

Even if the condition is made more lenient to the upper limit value of the inspection standard of 1.01461 pF and the lower limit value of 0.98539 pF with respect to the product lot 11, and the characteristic values of all the products 10 belonging to the range smaller by three times the measurement value standard deviation GRR than the upper limit value of the inspection standard and the range greater by three times the measurement value standard deviation GRR than the lower limit value of the inspection range are re-measured and re-determination is carried out based on the same inspection standard, the consumer risk CR of the product 10 determined as a non-defective article in the second becomes 181.00 ppm, and the non-defective article rate improves to 42.23%. Through the processes described above, the number of the products 10 to re-determine can be reduced significantly to about ⅛ in a case where targeting all the products 10 belonging to the range smaller than or equal to the upper limit value and greater than or equal to the lower limit value, and the non-defective article rate can be improved by 0.11%.

Therefore, in the product inspection device according to the second embodiment, whether or not the product lot 11 is a non-defective lot can be determined by carrying out the processes described above, and the shipment of the product lot 11 determined as a defective lot can be prevented when the consumer risk CR of the product lot 11 is greater than the predetermined consumer risk. In the product inspection device according to the second embodiment, the product 10 is further re-determined, so that the consumer risk CR of the product lot 11 can be made smaller than the predetermined consumer risk and the non-defective article rate can be improved.

It should be recognized that the second embodiment described above can be changed within a scope not deviating from the purpose of the present invention. For instance, not limited to the case of determining whether or not the product lot 11 is a non-defective lot based only on the consumer risk, whether or not the product lot 11 is a non-defective lot may be determined based on only the producer risk, or on both the consumer risk and the producer risk.

Third Embodiment

In a product inspection device according to a third embodiment of the present invention, the measurement value standard deviation GRR is calculated based on the result of measuring the characteristic value of some or all the products 10 contained in the product lot 11 rather than being calculated in advance using the method of evaluating uncertainty, the method of measurement system analysis MSA, and the like before measuring the characteristic value of the product 10. The block diagram showing the configuration example of the product inspection device according to the third embodiment is the same as the block diagram showing the configuration example shown in FIG. 1 of the first embodiment, and thus the detailed description will be omitted.

Figure 10:
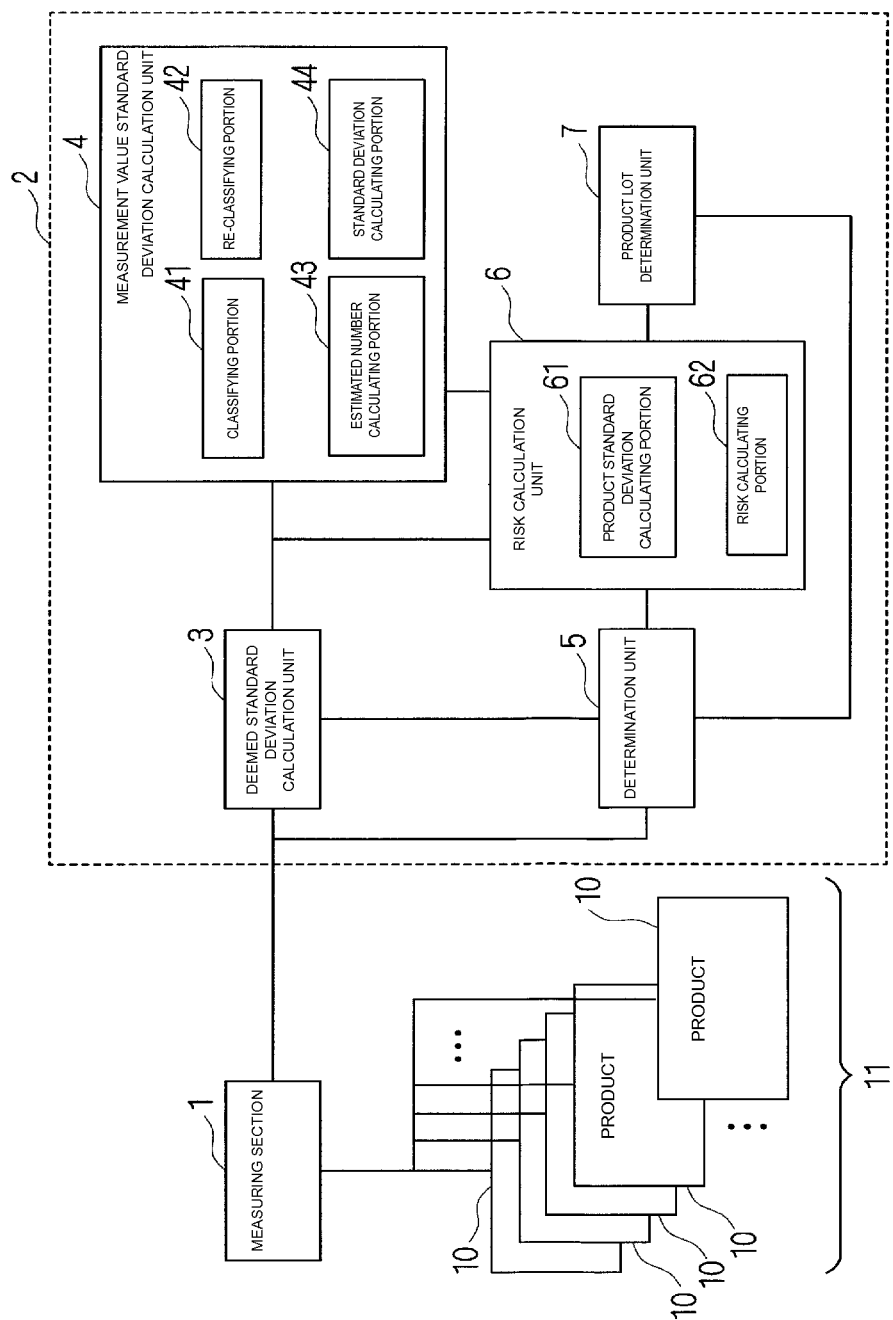
FIG. 10 is a functional block diagram of a product inspection device according to a third embodiment of the present invention.

The operation of the product inspection device according to the third embodiment will be described. FIG. 10 is a functional block diagram of the product inspection device according to the third embodiment of the present invention. The functional block diagram of the product inspection device shown in FIG. 10 is the same as the functional block diagram of the product inspection device shown in FIG. 7 of the second embodiment except for the configuration of the measurement value standard deviation calculation unit 4, and thus the same reference numerals are denoted on the same configuring elements and the detailed description will be omitted.

The measurement value standard deviation calculation unit 4 includes a classifying portion 41, a re-classifying portion 42, an estimated number calculating portion 43, and a standard deviation calculating portion 44.

The classifying portion 41 classifies the products 10 to non-defective articles and defective articles according to the inspection standard based on the characteristic values measured in the measuring section 1. The classifying portion 41 classifies the products 10 belonging to the range smaller than or equal to the upper limit value and greater than or equal to the lower limit value of the inspection standard as non-defective articles, and the products 10 belonging to the range smaller than the lower limit value of the inspection standard and a range greater than the upper limit value of the inspection standard as defective articles. The classifying portion 41 may classify the products 10 using the result of determination whether or not the products 10 are non-defective articles in the determination unit 5.

Figure 11:
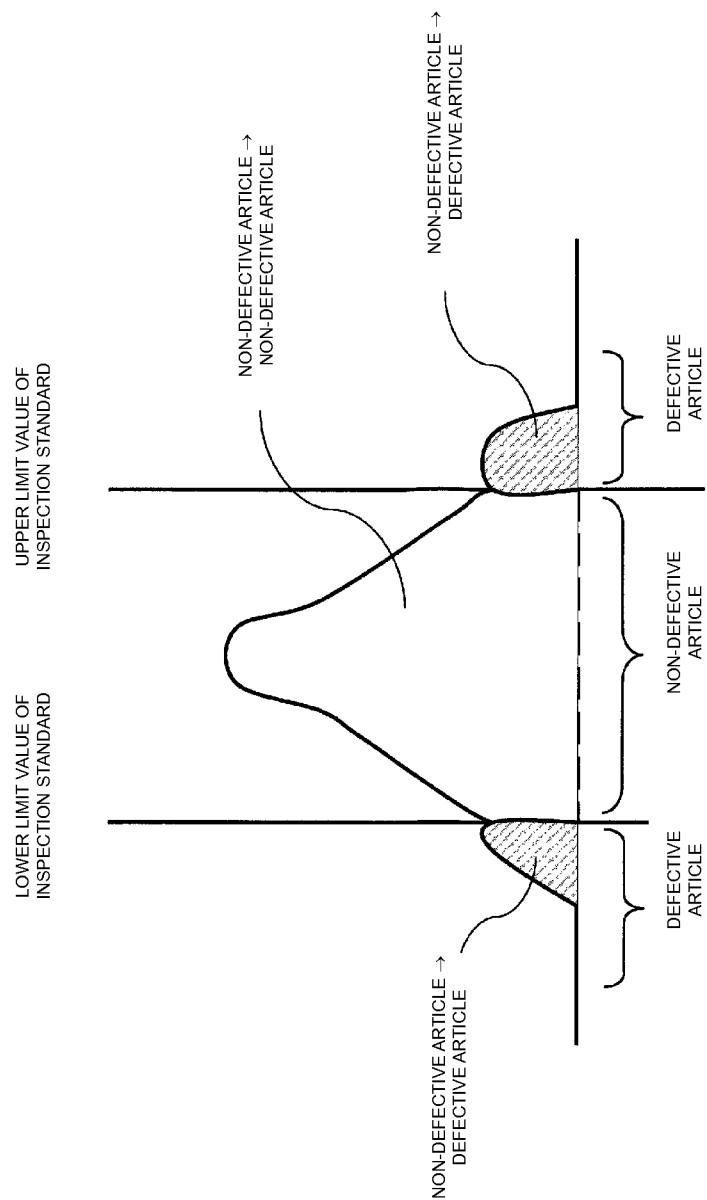
FIG. 11 is a schematic view showing a probability distribution in a case where a re-classifying portion of the product inspection device according to the third embodiment of the present invention re-classifies products classified as non-defective articles.

The re-classifying portion 42 re-measures in the measuring section 1 the characteristic values of the products 10 classified as non-defective articles or defective articles in the classifying portion 41, and re-classifies the products 10 classified as non-defective articles or defective articles to the non-defective articles and the defective articles according to the inspection standard same as that of the classifying portion 41 based on the re-measured characteristic values. A specific example in which the re-classifying portion 42 re-classifies the products 10 classified as non-defective articles to non-defective articles and the defective articles will be described using the drawing. FIG. 11 is a schematic view showing a probability distribution in a case where the re-classifying portion 42 of the product inspection device according to the third embodiment of the present invention re-classifies the products 10 classified as non-defective articles. In FIG. 11, the upper limit value and the lower limit value of the inspection standard are shown. FIG. 11 shows that the products 10 classified as non-defective articles in the classifying portion 41 are re-classified as defective articles by the measurement value variation of the measuring section 1, and the products 10 classified as non-defective articles in the classifying portion 41 are re-classified as non-defective articles.

The re-classifying portion 42 may use the result of the determination unit 5 re-measuring the characteristic values of the products 10 classified as non-defective articles or defective articles in the measuring section 1, and re-determining whether or not the products 10 are non-defective articles based on the re-measured characteristic values after determining whether or not a non-defective lot in the product lot determination unit 7.

As a result of re-classification in the re-classifying portion 42, the products 10 are re-classified to the non-defective articles and the defective articles. The condition of the product 10 re-classified as a defective article by the re-classifying portion 42 is the following two types of conditions, namely, the first and second conditions. The first condition is that the product 10 is truly a non-defective article, and is classified as a non-defective article in the classifying portion 41 and re-classified as a defective article in the re-classifying portion 42. The second condition is that the product 10 is truly a defective article, and is classified as a non-defective article in the classifying portion 41 and re-classified as a defective article in the re-classifying portion 42.

The product 10 is re-classified as a defective article by the re-classifying portion 42 as it includes the measurement value standard deviation GRR, where the deemed standard deviation TV is expressed with the product standard deviation PV and the measurement value standard deviation GRR as shown in (equation 1). In order to calculate the measurement value standard deviation GRR, (equation 1) and the number of the products 10 satisfying the first condition and the second condition both need to be satisfied.

The number of the products 10 satisfying the first and second conditions can be estimated based on the calculation formula (equation 2) of the consumer risk CR and the calculation formula (equation 3) of the producer risk PR.

The simultaneous equation of the double integral equation of (equation 2) and (equation 3) that satisfies the first condition and the second condition, and (equation 1) needs to be solved to calculate the product standard deviation PV and the measurement value standard deviation GRR using (equation 2) and (equation 3). However, it is difficult to mathematically solve such simultaneous equation.

Thus, in the product inspection device according to the third embodiment, the product standard deviation PV and the measurement value standard deviation GRR that satisfy both (equation 1) and the number of the products 10 satisfying the first condition and the second condition are to be calculated using the estimated number calculating portion 43 and the standard deviation calculating portion 44 shown in FIG. 10. The estimated number calculating portion 43 estimates the number of the products 10 re-classified as defective articles based on the probability distribution of the deemed standard deviation TV having the product standard deviation PV and the measurement value standard deviation GRR as variables, and calculates the same as the estimated number of the products 10 re-classified as defective articles. The standard deviation calculating portion 44 changes the variables of the probability distribution of the deemed standard deviation such that the number of the products 10 re-classified as defective articles in the re-classifying portion 42 and the estimated number of the products 10 reclassified as defective articles substantially match each other, and calculates the changed variables as the product standard deviation PV and the measurement value standard deviation GRR.

Figure 12:
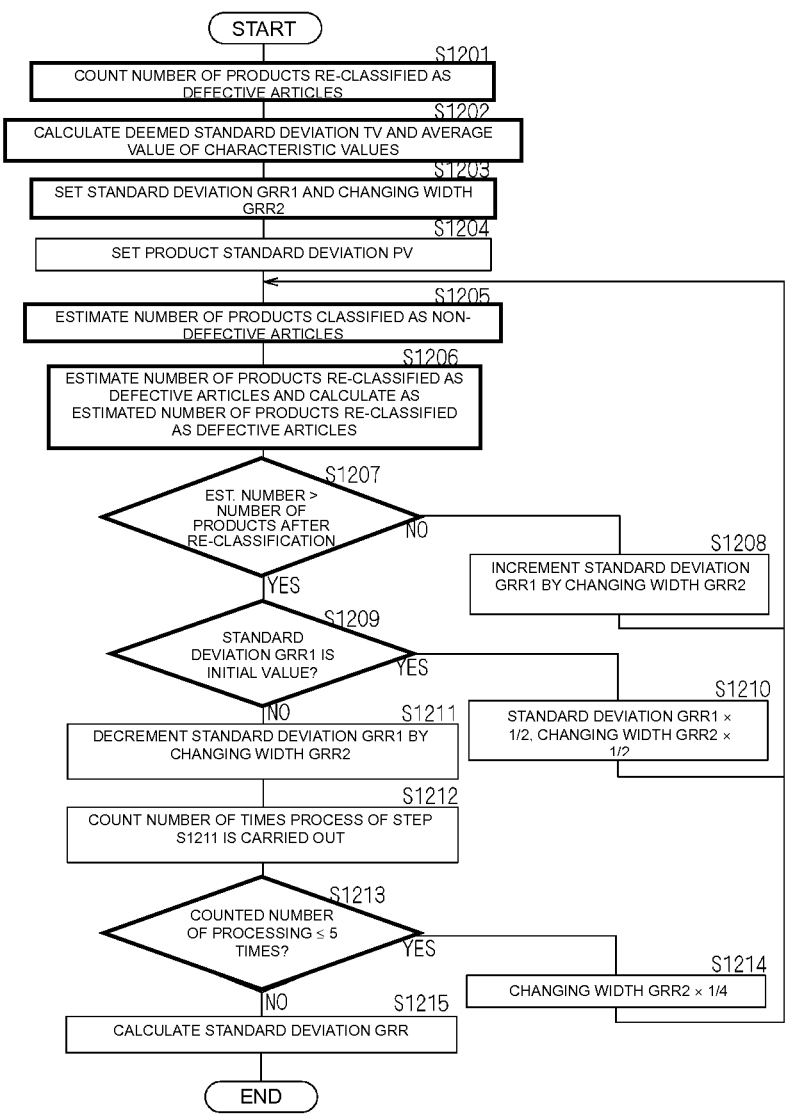
FIG. 12 is a flowchart showing a processing procedure in which the product inspection device according to the third embodiment of the present invention calculates a measurement value standard deviation GRR.

Specifically, the processing procedure of calculating the measurement value standard deviation GRR in the product inspection device according to the third embodiment will be described using a flowchart. FIG. 12 is a flowchart showing a processing procedure in which the product inspection device according to the third embodiment of the present invention calculates the measurement value standard deviation GRR.

The CPU 21 of the calculation processing section 2 re-classifies in the re-classifying portion 42 the products 10 classified as non-defective articles in the classifying portion 41, and counts the number of the products 10 classified as defective articles (step S1201).

The CPU 21 calculates the deemed standard deviation TV and the average value of the characteristic values from the characteristic values of the products 10 measured in the measuring section 1 (step S1202).

The CPU 21 sets the measurement value standard deviation GRR as GRR1=0.1TV (initial value), and sets the changing width GRR2 of the measurement value standard deviation GRR as GRR2=(TV−GRR1)/10=(TV−0.1TV)/10=0.09TV (step S1203).

The CPU 21 sets the product standard deviation PV based on the calculated deemed standard deviation TV and the set measurement value standard deviation GRR1 (step S1204), and estimates the number of the products 10 classified as non-defective articles from the probability distribution of the set product standard deviation PV (step S1205). The processing procedure of step S1205 estimates the number of the products 10 classified as non-defective articles using one part of the processing procedure shown in FIG. 4. However, the processing procedure shown in FIG. 4 is applied assuming that the inspection standard and the product standard are defined as the same condition.

The CPU 21 further divides the probability distribution of the products 10 classified as non-defective articles into a plurality of zones, estimates the number of the products 10 re-classified as defective articles in the re-classifying portion 42 assuming that the probability distribution in each zone follows the probability distribution of the measurement value standard deviation GRR1, and calculates the same as the estimated number of the products 10 re-classified as defective articles (step S1206). The processing procedure of step S1206 also estimates the number of the products 10 re-classified as defective articles using one part of the processing procedure shown in FIG. 4.

The CPU 21 determines whether or not the estimated number is greater than the number of the products 10 re-classified as defective articles counted in step S1201 (step S1207). If the CPU 21 determines that the estimated number is smaller than or equal to the number of the products 10 re-classified as defective articles counted in step S1201 (step S1207: NO), the CPU 21 increments the measurement value standard deviation GRR1 by the changing width GRR2 (step S1208), and returns the process to step S1205. Specifically, in step S1208, the measurement value standard deviation GRR1 is incremented by the changing width GRR2 (0.09TV) such as 0.1TV+0.09TV, 0.1TV+0.09TV+0.09TV, . . . until the estimated number becomes greater than the number of the products 10 re-classified as defective articles counted in step S1201.

If the CPU 21 determines that the estimated number is greater than the number of the products 10 classified as defective articles counted in step S1201 (step S1207: YES), the CPU 21 determines whether or not the measurement value standard deviation GRR1 is an initial value (0.1TV) (step S1209).

If the CPU 21 determines that the measurement value standard deviation GRR1 is the initial value (0.1TV) (step S1209: YES), the measurement value standard deviation GRR becomes smaller than the GRR1, and thus the CPU 21 sets the measurement value standard deviation GRR1 to one half (GRR1=0.05TV), sets the changing width GRR2 to one half (0.045TV) (step S1210), and returns the process to step S1205.

If the CPU 21 determines that the measurement value standard deviation GRR1 is not the initial value (0.1TV) (step S1209: NO), the CPU 21 decrements the measurement value standard deviation GRR1 by the changing width GRR2 to raise the accuracy of the measurement value standard deviation GRR1 (step S1211).

The CPU 21 counts the number of times the process of step S1211 was carried out (step S1212), and determines whether or not the counted number of processing is five times or less (step S1213). If the CPU 21 determines that the counted number of processing is five times or less (step S1213: YES), the accuracy of the measurement value standard deviation GRR1 is determined as still insufficient, and the CPU 21 sets the changing width GRR2 to one fourth (step S1214) and returns the process to step S1205. If the CPU 21 determines that the counted number of processing is greater than five times (step S1213: NO), the accuracy of the measurement value standard deviation GRR1 is determined as sufficient, and the CPU 21 calculates a value in which the measurement value standard deviation GRR1 of after the process of step S1211 is increased by one half of the changing width GRR2 as the measurement value standard deviation GRR (step S1215).

In step S1206 of the flowchart shown in FIG. 12, it is not limited to a case of estimating the number of the products 10 re-classified as defective articles in the re-classifying portion 42 from the probability distribution of the products 10 classified as non-defective articles, and calculating as the estimated number of the products 10 re-classified as defective articles, and the number of the products 10 re-classified as defective articles in the re-classifying portion 42 may be estimated from the probability distribution of the products 10 classified as defective articles and calculated as the estimated number of the products 10 re-classified as defective articles.

For instance, when a capacitor having a condenser capacity of 1.5 pF is the product 10, 10000 products 10 are sampled from the product lot 11 including 200 thousand products 10 in the classifying portion 41 according to the inspection standard in which the upper limit value is 1.515 pF and the lower limit value is 1.485 pF to classify into the non-defective articles and the defective articles, where 7056 products 10 are classified as non-defective articles, 1423 products 10 are classified as defective articles greater than the upper limit value, and 1521 products 10 are classified as defective articles smaller than the lower limit value. If 7056 products 10 classified as non-defective articles are re-classified by the re-classifying portion 42 according to the same inspection standard, 6841 products 10 are re-classified as non-defective articles, 110 products 10 are re-classified as defective articles greater than the upper limit value, and 105 products 10 are classified as defective articles smaller than the lower limit value. Calculating the measurement value standard deviation GRR using the processing procedure shown in FIG. 12, GRR=0.00118 pF is calculated.

Furthermore, calculating the consumer risk CR through the processes described in FIG. 4 of the first embodiment using the calculated measurement value standard deviation GRR and the like with the upper limit value of the product standard as 1.52 pF and the lower limit value as 1.48 pF, 0.06 ppm is calculated. If the predetermined consumer risk defined when inspecting the characteristic value of the product 10 and shipping the product 10 is set to be smaller than or equal to 12 ppm, the product lot 11 may be shipped as a non-defective lot. However, the consumer risk CR takes a significantly small value of 0.06 ppm smaller than the predetermined consumer risk of 12 ppm. The inspection standard is thus changed so that the calculated consumer risk CR becomes closer to the predetermined consumer risk, so that the non-defective article rate of the product lot 11 can be improved. If the upper limit value of the inspection standard is changed to 1.5165 pF and the lower limit value to 1.4835 pF such that the consumer risk CR becomes 10 ppm, the non-defective article rate improves from 70.57% to 75.14%.

A case of inspecting different product lots 11 with the product inspection device will now be described. If the product lot 11 includes the capacitor having the condenser capacity of 1.5 pF for the product 10, when 200 thousand products 10 are all classified in the classifying portion 41 according to the inspection standard in which the upper limit value is 1.515 pF and the lower limit value is 1.485 pF, 142306 products 10 are classified as non-defective articles (non-defective article rate of 71.15%), 31349 products 10 are classified as defective articles greater than the upper limit value, and 26345 products 10 are classified as defective articles smaller than the lower limit value. If 57694 (31349+ 26345) products 10 classified as defective articles are re-classified by the re-classifying portion 42 according to the same inspection standard, 5701 products 10 are re-classified as non-defective articles, 28331 products 10 are re-classified as defective articles greater than the upper limit value, and 23662 products 10 are classified as defective articles smaller than the lower limit value. Calculating the measurement value standard deviation GRR using the processing procedure shown in FIG. 12, GRR=0.00157 pF is calculated.

Furthermore, calculating the consumer risk CR through the processes described in FIG. 4 of the first embodiment using the calculated measurement value standard deviation GRR and the like with the upper limit value of the product standard as 1.52 pF and the lower limit value as 1.48 pF, 5.98 ppm is calculated. If the predetermined consumer risk defined when shipping the product 10 by inspecting the characteristic value of the product 10 is set to be smaller than or equal to 12 ppm, the product lot 11 may be shipped as a non-defective lot. The consumer risk CR of 142306 products 10 classified as non-defective articles and the consumer risk CR of 5701 products 10 re-classified as non-defective articles by re-classifying 57694 products 10 classified as defective articles are about the same. Thus, if the 142306 products 10 classified as non-defective articles and the 5701 products 10 re-classified as non-defective articles are shipped all together as non-defective articles, the consumer risk CR becomes 11.95 ppm, and the non-defective article rate becomes 74.00%.

Therefore, in the product inspection device according to the third embodiment, the measurement value standard deviation GRR can be calculated by carrying out the processes described above, so that the measurement value standard deviation GRR does not need to be calculated in advance using the method of evaluating uncertainty, the method of measurement system analysis MSA, or the like before measuring the characteristic value of the product 10. Furthermore, since the characteristic value of the product 10 greater than for the measurement value standard deviation calculated using the method of measurement system analysis MSA is measured, and the measurement value standard deviation GRR calculated in the third embodiment is calculated based on the great number of measured characteristic values, the accuracy enhances compared to the measurement value standard deviation GRR calculated through the method of measurement system analysis MSA. Furthermore, in the product inspection device according to the third embodiment, the result of re-determining in the determination unit 5 can be used when re-determining whether or not the product 10 is a non-defective article in the determination unit 5 as in the second embodiment, so that the characteristic value of the product 10 does not need to be measured merely to calculate particularly the measurement value standard deviation GRR.

It should be recognized that the third embodiment described above can be changed within a scope not deviating from the purpose of the present invention. For instance, not limited to a case of estimating the number of the products 10 re-classified as defective articles and calculating as the estimated number of re-classified products 10 assuming that the probability distribution in each zone of the product standard deviation PV follows the probability distribution of the measurement value standard deviation GRR, the characteristic value of the product 10 based on the probability distribution of the deemed standard deviation TV having the product standard deviation PV and the measurement value standard deviation GRR as variables may be generated through the Monte Carlo method, and the number of the products 10 re-classified as defective articles may be estimated to be calculated as the estimated number of re-classified products 10.

DESCRIPTION OF REFERENCE SYMBOLS 1 measuring section
2 calculation processing section
3 deemed standard deviation calculation unit
4 measurement value standard deviation calculation unit
5 determination unit
6 risk calculation unit
7 product lot determination unit
10 product
11 product lot 21 CPU
22 memory
23 storage device
24 I/O interface
25 video interface
26 portable disc drive
27 measurement interface
28 internal bus
41 classifying portion
42 re-classifying portion
43 estimated number calculating portion
44 standard deviation calculating portion
61 product standard deviation calculating portion
62 risk calculating portion
90 portable storage medium
230 computer program
241 keyboard
242 mouse
251 display device

The invention claimed is:

1. A product inspection device comprising:
a measuring section configured to measure characteristic values indicating predetermined characteristics of products;
a deemed standard deviation calculation unit that calculates a standard deviation of variation in the measured characteristic values as a deemed standard deviation;
a measurement value standard deviation calculation unit that calculates a standard deviation of measurement value variation indicating variation in measurement results of the measuring section as a measurement value standard deviation;
a determination unit that determines whether or not each of the products is a non-defective article depending on whether or not the measured characteristic value is in a range smaller than or equal to an upper limit value and greater than or equal to a lower limit value, wherein an inspection standard defines the upper limit value and the lower limit value of the characteristic values for determining defectiveness of the products as a reference; and
a risk calculation unit that calculates a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation, wherein
the measuring section measures the characteristic values of a set of the products contained in a product lot having a predetermined number of the products as one unit;
the deemed standard deviation calculation unit calculates the deemed standard deviation from the measured characteristic values of the set of the products;
the risk calculation unit calculates the consumer risk and the producer risk based on the average value of the measured characteristic values of the set of the products, the deemed standard deviation, and the measurement value standard deviation; and
the determination unit changes the inspection standard based on at least one of the calculated consumer risk or the calculated producer risk, and determines whether or not all the products contained in the product lot are non-defective articles with the changed inspection standard as a reference.

2. The product inspection device according to claim 1, wherein the risk calculation unit includes:
a product standard deviation calculating unit that calculates the standard deviation of the characteristic value variation of the products as a product standard deviation based on the deemed standard deviation and the measurement value standard deviation; and
a risk calculating unit that divides a probability distribution of the calculated product standard deviation into a plurality of zones, and calculates a probability that any product in a zone out of the product standard is mistakenly determined as a product in a zone within the product standard as the consumer risk and calculating a probability that any product in a zone within the product standard is mistakenly determined as a product in a zone out of the product standard as the producer risk, when the probability distribution in each of the plurality of zones follows the probability distribution of the measurement value standard deviation.

3. The product inspection device according to claim 1, wherein the measurement value standard deviation calculation unit includes:
a classifying unit that classifies the products to non-defective articles and defective articles according to the inspection standard based on the measured characteristic values;
a re-classifying unit that re-measures the characteristic values of the products classified as non-defective articles or defective articles, and re-classifies the products to non-defective articles and defective articles according to the inspection standard based on the re-measured characteristic values;
an estimated number calculating unit that calculates the number of the products re-classified as non-defective articles or the number of the products re-classified as defective articles when re-classified at least once as an estimated number of the products re-classified as non-defective articles or defective articles, based on the probability distribution of the deemed standard deviation having the standard deviation of the characteristic value variation of the products and the measurement value standard deviation as variables; and
a standard deviation calculating unit that changes the variables of the probability distribution of the deemed standard deviation such that the number of the products re-classified as non-defective articles or the number of the products re-classified as defective articles when re-classified at least once and the estimated number of the products re-classified as non-defective articles or defective articles substantially match each other, and calculates the changed variables as the standard deviation of the characteristic value variation of the products and the measurement value standard deviation.

4. A product inspection method comprising:
measuring characteristic values indicating predetermined characteristics of products;
calculating a standard deviation of variation in the measured characteristic values as a deemed standard deviation;
calculating a standard deviation of measurement value variation indicating variation in measurement results as a measurement value standard deviation;
determining whether or not each of the products is a non-defective article depending on whether or not the measured characteristic value is in a range smaller than or equal to an upper limit value and greater than or equal to a lower limit value, wherein an inspection standard defines the upper limit value and the lower limit value of the characteristic values for determining defectiveness of the products as a reference; and calculating a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation, wherein the characteristic values of a set of the products contained in a product lot having a predetermined number of the products as one unit are measured, the deemed standard deviation is calculated from the measured characteristic values of the set of the products, the consumer risk and the producer risk are calculated based on the average value of the measured characteristic values of the set of the products, the deemed standard deviation, and the measurement value standard deviation, and the inspection standard is changed based on at least one of the calculated consumer risk or the calculated producer risk, and whether or not all the products contained in the product lot are non-defective articles is determined with the changed inspection standard as a reference.

5. The product inspection method according to claim 4, wherein the standard deviation of the characteristic value variation of the products is calculated as a product standard deviation based on the deemed standard deviation and the measurement value standard deviation, and a probability distribution of the calculated product standard deviation is divided into a plurality of zones, a probability that any product in a zone out of the product standard is mistakenly determined as a product in a zone within the product standard is calculated as the consumer risk and a probability that any product in a zone within the product standard is mistakenly determined as a product belonging to a zone out of the product standard is calculated as the producer risk, when the probability distribution in each of the plurality of zones follows the probability distribution of the measurement value standard deviation.

6. The product inspection method according to claim 4, wherein the products are classified to non-defective articles and defective articles according to the inspection standard based on the measured characteristic values, the characteristic values of the products classified as non-defective articles or defective articles are re-measured, and the products are re-classified to non-defective articles and defective articles according to the inspection standard based on the re-measured characteristic values, the number of the products re-classified as non-defective articles or the number of the products re-classified as defective articles when re-classified at least once is calculated as an estimated number of the products re-classified as non-defective articles or defective articles, based on the probability distribution of the deemed standard deviation having the standard deviation of the characteristic value variation of the products and the measurement value standard deviation as variables, and the variables of the probability distribution of the deemed standard deviation are changed such that the number of the products re-classified as non-defective articles or the number of the products re-classified as defective articles when re-classified at least once and the estimated number of the products re-classified as non-defective articles or defective articles substantially match each other, and the changed variables are calculated as the standard deviation of the characteristic value variation of the products and the measurement value standard deviation.

7. A non-transitory computer-readable medium executable in a product inspection device for inspecting products, the non-transitory computer-readable medium causing the product inspection device to:

measure characteristic values indicating predetermined characteristics of products;

calculate a standard deviation of variation in the measured characteristic values as a deemed standard deviation;

calculate a standard deviation of measurement value variation indicating variation in measurement results as a measurement value standard deviation;

determine whether or not each of the products is a non-defective article depending on whether or not the measured characteristic value is in a range smaller than or equal to an upper limit value and greater than or equal to a lower limit value with an inspection standard defining the upper limit value and the lower limit value of the characteristic values for determining defectiveness of the products as a reference; and calculate a consumer risk as a probability that a product out of a product standard is mistakenly determined as a non-defective article by the measurement value variation and a producer risk as a probability that a product within the product standard is mistakenly determined as a defective article by the measurement value variation, based on an average value of the measured characteristic values, the deemed standard deviation, and the measurement value standard deviation, wherein the characteristic values of a set of the products contained in a product lot having a predetermined number of the products are measured as one unit, the deemed standard deviation is calculated from the measured characteristic values of the set of the products, the consumer risk and the producer risk is calculated based on the average value of the measured characteristic values of the set of the products, the deemed standard deviation, and the measurement value standard deviation, and the inspection standard is changed based on at least one of the calculated consumer risk or the calculated producer risk, and determining whether or not all the products contained in the product lot are non-defective articles with the changed inspection standard as a reference.

8. The non-transitory computer-readable medium according to claim 7, wherein the non-transitory computer-readable medium causes the product inspection device to further:

calculate the standard deviation of the characteristic value variation of the products as a product standard deviation based on the deemed standard deviation and the measurement value standard deviation; and divide a probability distribution of the calculated product standard deviation into a plurality of zones, and calculate a probability that any product belonging to a zone out of the product standard is mistakenly determined as a product belonging to a zone within the product standard as the consumer risk and calculate a probability that any product belonging to a zone within the product standard is mistakenly determined as a product belonging to a zone out of the product standard as the producer risk, when the probability distribution in each of the plurality of zones follows the probability distribution of the measurement value standard deviation.

9. The non-transitory computer-readable medium according to claim 7, wherein the non-transitory computer-readable medium causes the product inspection device to further:

classify the products to non-defective articles and defective articles according to the inspection standard based on the measured characteristic values;

re-measure the characteristic values of the products classified as non-defective articles or defective articles, and re-classify the products to non-defective articles and defective articles according to the inspection standard based on the re-measured characteristic values;

calculate the number of the products re-classified as non-defective articles or the number of the products re-classified as defective articles when re-classified at least once as an estimated number of the products re-classified as non-defective articles or defective articles, based on the probability distribution of the deemed standard deviation having the standard deviation of the characteristic value variation of the products and the measurement value standard deviation as variables; and change the variables of the probability distribution of the deemed standard deviation such that the number of the products re-classified as non-defective articles or the number of the products re-classified as defective articles when re-classified at least once and the estimated number of the products re-classified as non-defective articles or defective articles substantially match each other, and calculate the changed variables as the standard deviation of the characteristic value variation of the products and the measurement value standard deviation.

* * * * *